United States Patent
Pescosolido et al.

(10) Patent No.: US 9,372,675 B1
(45) Date of Patent: Jun. 21, 2016

(54) UNIFIED DECLARATIVE MODEL FOR USER INTERFACES

(71) Applicant: Appian Corporation, Reston, VA (US)

(72) Inventors: Marco Pescosolido, Arlington, VA (US); Annelise Dubrovsky, Vienna, VA (US); Brian Joseph Sullivan, Bethesda, MD (US); Antonio Andrade Garcia, Washington, DC (US); Carlos Santiago Aguayo Rico, Fairfax, VA (US); Raziel Alvarez Guevara, Menlo Park, CA (US); Cody Allen Smith, Clayton, MO (US); Matthew David Hilliard, Reston, VA (US)

(73) Assignee: Appian Corporation, Reston, VA (US)

( * ) Notice: Subject to any disclaimer, the term of this patent is extended or adjusted under 35 U.S.C. 154(b) by 298 days.

(21) Appl. No.: 14/161,177

(22) Filed: Jan. 22, 2014

(51) Int. Cl.
*G06F 9/44* (2006.01)
*G06F 3/048* (2013.01)
*H04L 12/24* (2006.01)

(52) U.S. Cl.
CPC *G06F 8/38* (2013.01); *G06F 3/048* (2013.01); *H04L 41/22* (2013.01)

(58) Field of Classification Search
CPC ..... G06F 9/4443; G06F 17/3097; G06F 8/38; G06F 17/211; G06F 17/227; H04L 67/10
See application file for complete search history.

(56) References Cited

U.S. PATENT DOCUMENTS

| | | | | |
|---|---|---|---|---|
| 7,685,252 B1* | 3/2010 | Maes | ..................... | G06F 9/4443 709/217 |
| 2004/0223009 A1* | 11/2004 | Szladovics | ............ | G06F 9/4443 715/760 |
| 2005/0273759 A1* | 12/2005 | Lucassen | .................. | G06F 8/38 717/105 |
| 2008/0092057 A1* | 4/2008 | Monson | ................ | G06F 9/4443 715/744 |
| 2009/0300656 A1* | 12/2009 | Bosworth | ............... | H04L 67/10 719/320 |
| 2011/0289141 A1* | 11/2011 | Pletter | ............... | G06F 17/30575 709/203 |
| 2013/0226952 A1* | 8/2013 | Lal | ...................... | G06F 17/3097 707/767 |

* cited by examiner

*Primary Examiner* — Tuan Vu
(74) *Attorney, Agent, or Firm* — Fish & Richardson P.C.

(57) ABSTRACT

In one implementation for providing a user interface of a software application, a request to enable a user to perceive the user interface of the software application may be received. A context and a user interface expression may be determined based on the request. The user interface expression may be evaluated based on the context to generate a user interface definition. The user interface definition may be provided to a user interface renderer. The user interface renderer may be configured to process the user interface definition to enable the user to perceive the user interface.

20 Claims, 12 Drawing Sheets

```
=load(
  username,
  first,
  last,
  type!ColumnArrayLayout(
    columns:{
      type!ColumnLayout(
        contents: {
          type!TextField(
            label: "Username",
            value:username,
            refreshAfter:"KEYPRESS",
            saveInto:username<<fn!lower,
            validations:{
              {message: if(and(not(isnull(username)), isusernametaken(username)), "already taken", "")}
            }
          )
        }
      ),
      type!ColumnLayout(
        contents: {
          type!TextField(
            label: "First Name",
            value:if(isnull(first),proper(index(split(username, "."), 1, "")),first),
            refreshAfter:"ONBLUR",
            saveInto:first
          ),
          type!TextField(
            label: "Last Name",
            value:if(isnull(last),proper(index(split(username, "."), 2, "")),last),
            saveInto:last
          )
        }
      )
    }
  )
)
```

UNIFIED DECLARATIVE MODEL FOR USER INTERFACES

TECHNICAL FIELD

The following disclosure generally relates to software applications.

BACKGROUND

Software developers may develop software applications that may be used to perform various tasks. A software application may have a user interface that enables a user to provide data to the software application and perceive data provided by the software application.

BRIEF DESCRIPTION OF THE FIGURES

FIG. 3 is an example UI expression.

DETAILED DESCRIPTION

Figure 1:
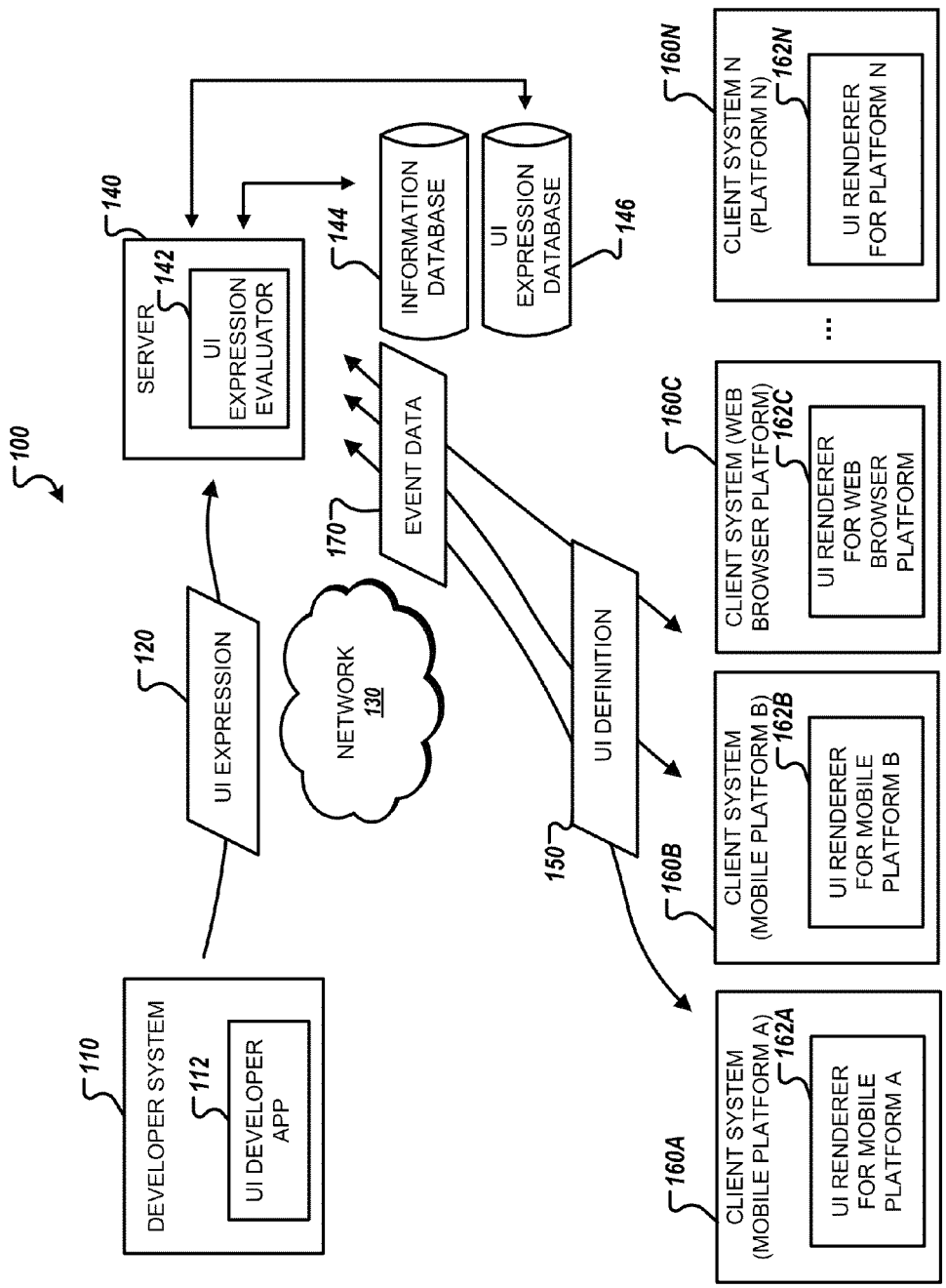
FIG. 1 illustrates an example system that enables use of user interface (UI) expressions.

Software applications may be specific to different platforms. A platform may refer to an operating environment, e.g., an operating system, in which a software application may be run. For example, different platforms include the iOS operating system on a mobile phone, the Android operating system on a tablet computer, and the Windows operating system on a desktop computer.

Software applications that are specific to particular platforms may be referred to as native applications. For example, a native application may run on the iOS operating system, but may not run on the Android operating system. Conversely, another native application may run on the Android operating system, but may not run on an iOS operating system. Native applications may be specific to particular platforms due to being developed using code in a particular programming language that is specific to the platform. For example, software applications for the Android operating system may be coded in the Java programming language and software applications for the iOS operating system may be coded in the Objective C programming language. Thus, the Java code for native applications for the Android operating system may not be used for native applications for the iOS operating system.

Accordingly, for a software developer to provide the same software functionality in different platforms, software developers may need to create a different native application for each of the different platforms. Creating a different native application for each of the different platforms may be time intensive, and also may be difficult. This difficulty may be at least partially due to the software developer being required to know how to code in each of the different programming languages used by the different platforms.

A software developer may not be proficient in coding using different programming languages at least partially due to the coding in particular programming languages not being intuitive. Programming languages may be generally categorized as either imperative programming languages or declarative programming languages. As described in more detail below, coding using a declarative programming language may be more intuitive in many ways than coding using an imperative programming language.

Imperative programming languages may be programming languages that use imperative code, which is a type of code that instructs the platform to execute a sequence of actions that, after being executed in the specified sequence, achieve a particular result that the developer wants. Many programming languages, such as, for example, Objective C used for the iOS operating system, Java used for the Android operating system, and JavaScript, which can be used in browser and server applications, are imperative programming languages.

A simple example of imperative code for maintaining an array which is double a given array is shown below:

```
var num=[1, 2, 3, 4]
//this is the doubled array
double_num
//the doubled array needs to be initialized
for(var counter=0; counter<num.length; counter=counter+1) {
    double_num[counter]=num[counter]*2
}
//the doubled array needs to be updated every time num is
    updated, therefore access to num must be controlled:
updateNum(index,value) {
    num[index]=value
    double_num[index]=value*2
}
```

The above imperative code explicitly instructs the platform to initialize the variable "num" to an array with the value of "[1, 2, 3, 4]." A variable may be a reference to information that may be changed, e.g., a reference to the information "[1, 2, 3, 4]," which may be changed to "[2, 4, 6, 8]." The variable's name, e.g., "num," may represent what information the variable contains.

The imperative code then explicitly instructs the platform to initialize the variable "counter" to the value "0" to loop through the following code until the value of the variable "counter" is no longer less than the number of elements in the variable "num," where after each loop, the value of the variable "counter" is incremented by one. The looped code instructs the platform to double the value of the element of the variable "num" referenced by the value of the variable "counter" and store the doubled value in a corresponding element of the variable "double_num." For example, during the first iteration, the platform may double the value of the first element from "1" to "2," and store "2" as the first element in variable "double_num" and during the second iteration, the platform may double the value of the second element from "2" to "4," and store "4" as the second element in variable "double_num." The end result after the code is executed is that the variable "double_num" has the value "[2, 4, 6, 8]."

The function "updateNum" may be used every time the value of the variable "num" is to be modified. The function "updateNum" may change the value of a particular element of the variable "num," and also update a value of a corresponding element of the variable "double_num."

If an array with tripled valued is also maintained, e.g., variable "triple_num," the variable "triple_num" may be similarly initialized and "triple_num[index]=value*3" added to the function updateNum. Other technical solutions for updating may also be used.

For example:
updateNum(index,value) {
   num[index]=value
   fireUpdateEvent(num,index,value)
}

Adding a new dependency can be done separately as:
subscribeToUpdateEvent(num, updateTriple)
updateTriple(index,value) {
   triple_num[index]=value*3;
}

However, all these examples may not be intuitive compared to the desired output, which is simply the invariants:
double_num=num*2
triple_num=num*3

In contrast to imperative programming languages, declarative programming languages may be programming languages that use declarative code, which is a type of code that simply defines a result that the developer wants, without describing the particular sequence of actions that need to be executed by the platform to achieve that desired result. Accordingly, in declarative programming languages, the developer does not directly specify the particular sequence of actions that need to be performed by the platform to achieve a desired result. Instead, the developer simply specifies a desired result, and the platform itself determines from that desired result which particular sequence of actions it must execute to provide that result. Because declarative programming languages may use simple, literal descriptions of desired outputs rather than complex programmatic logic describing the sequence of actions required to produce the desired outputs, declarative programming languages may be more intuitive than imperative programming languages.

A simple example of declarative code also for doubling numbers in an array is shown below:
var num=[1, 2, 3, 4]
num=num*2

The above declarative code similarly instructs that the variable "num" be initialized to the value of "[1, 2, 3, 4]." The declarative code then instructs that the values of the variable "num," should be doubled, without describing the particular sequence of actions that must be performed by the platform to double the values.

The platform may take the declarative code that defines a desired result, and based on the declarative code, may determine a sequence of actions that it needs to perform to provide the desired result. For example, the platform may analyze the above declarative code and determine from its analysis that it must perform a sequence of actions that is the same sequence of actions in the above imperative code example in order to provide the desired result. Accordingly, while the platform may ultimately perform the same actions to produce the same result using imperative code or declarative code, the declarative code may be more intuitive to understand because the developer is only required to define the desired result, rather than having to specify the often complex particular sequence of related actions that have to be performed to produce the desired result. The formula language used in Microsoft EXCEL® is a good example of a declarative programming language.

In other words, a declarative approach may make a simple declaration of the desired outcome corresponding to the actual implementation. E.g., saying that:
var double_num=num*2
var triple_num=num*3

The above declaration may actually provide a complete guarantee about the specified invariant conditions (which the system may ensure through whatever mechanisms are needed) regardless of how the variable "num" is updated, and without needing to specify any other functions to perform the updates. The declarative approach may make the, possibly minimalistic, description of the desired outcome both the complete specification and the complete implementation of the program.

Software applications may also not be specific to particular platforms. Software applications that are not specific to particular platforms may be referred to as non-native applications. For example, a non-native application may be a web-based application. A web-based application may be a software application that is coded in a browser-supported programming language and reliant on a web browser to render the code. Accordingly, if the web browser is common to different platforms, the web-based application may be run on the different platforms.

Non-native applications may be more efficient to develop, as a single non-native application programmed once may be used across different platforms. However, non-native applications may have certain disadvantages compared to native applications. For example, a non-native application may be constrained to being displayed within a web browser and may be constrained by the functionality supported by the web browser. On the other hand, a native application may be more efficient as it may be run without a web browser or other virtual or cross-platform environments, and may support functionality of the platform that the web browser does not support. For example, a native application would have programmatic access to the native platform's user interface components and interaction paradigms, enabling a user experience as defined by that platform.

Many software applications have graphical user interfaces (GUIs) that enable users to provide data to and receive data from the software application. Designing GUIs may be complicated and may require that a software developer code the GUI using multiple different programming languages. For example, one programming language may be used to provide a static graphical representation of the GUI to present to a user (e.g., Hypertext Markup Language (HTML)), another programming language may be used to provide dynamism in the graphical representation (e.g., JavaScript), another programming language may be used to provide styling and formatting instructions (e.g. Cascading Style Sheets (CSS)), and yet another programming language may be used to control communications with servers (e.g. JavaScript). Moreover, the programming languages used for designing a GUI often include relatively non-intuitive, imperative programming languages. Software developers that have limited coding experience may, therefore, be unable to design complex, dynamic and powerful GUIs for their applications because of the daunting task of having to code such a GUI. Additionally, if the software developer wishes to deploy native applications across multiple different platforms that use a GUI having the same functionality, the software developer may have to spend a lot of development time creating a different GUI for each of the different native applications on each platform.

To address these problems, a graphical UI (GUI) design and rendering architecture for both native and non-native applications is proposed that can support use of a unified, declarative representation to enable software developers to intuitively and, therefore, relatively easily code complex GUIs. The term "unified" may mean that the representation is a single uniform representation that represents aspects, e.g., layout, styling, dynamic behavior, network communications, of a user interface which normally require the use of multiple programming languages and paradigms e.g., HTML, CSS, JavaScript, etc. For example, instead of using HTML, JavaScript, and CSS for a GUI, software developers may use the proposed GUI design and rendering architecture to design GUIs using, for example, a single, purely declarative programming language that handles all or most aspects of the GUI, including, for example, static graphical formatting, graphical dynamism, and data storage and access communications. The proposed GUI design and rendering architecture also can enable the software developer to design a GUI once, which can then be quickly and easily deployed for use across any of multiple different platforms. Additionally, the proposed GUI design and rendering architecture may also provide a simple and intuitive way to fine-tune the dynamism of the GUI in a way that is simply not possible when using conventional approaches.

FIG. 1 illustrates an example system 100 that enables use of user interface (UI) expressions 120. A UI expression 120 may be declarative code defining one or more expressions that may be evaluated to produce a GUI. An expression may be a combination of explicit values, constants, variables, operators, and functions that may be evaluated to produce a GUI. For example, an expression may include declarations that define specific graphical elements, e.g., textual labels, buttons, text fields, textual labels, date/time selectors, grids, dropdowns, charts, etc., that should appear in a GUI.

An example UI expression 120 may be declarative code that defines a GUI that includes a text field having a default value that is the current date. A text field may be an area in which a user may input text, where the text in the text field may initially be a default value, e.g., "insert date here," before the user inputs text. Accordingly, when the UI expression 120 is evaluated on a particular date, e.g., "12/25/13," the result may produce a GUI with a text field with the value that is the particular date, e.g., "12/25/13." In another example, a UI expression 120 may be declarative code that defines a GUI having a textual label with the text corresponding to the value of a variable "username." A textual label may be text that appears in the GUI. Accordingly, when the UI expression 120 is evaluated when the value of the variable "username" is "george.washington," the result may produce a GUI having a textual label with the text "george.washington."

The UI expression 120 may be coded in a purely declarative programming language. For example, the UI expression 120 may be structured data in the form of extensible markup language (XML) that does not include any JavaScript or Java, which are both imperative programming languages. However, while the UI expression 120 may not include imperative code, the UI expression 120 may ultimately rely on imperative code. For example, the UI expression 120 may include a declarative use of a function named "SUM" that is provided by a library of functions. The function named "SUM" may be defined in the library of functions using imperative code, although the imperative code may not appear in the UI expression 120. Importantly and as described in more detail later, a software developer generally does not need to be aware of the imperative coding on which the UI expression 120 may rely. Instead, the software developer may simply identify a function for use in the UI expression 120 when coding the UI expression 120 without regard to the imperative code corresponding to that function that may be subsequently identified and executed during the evaluation of the UI expression 120.

Generally, the system 100 may include a developer system 110 for developing a UI expression 120, a server 140 for evaluating a UI expression 120 to generate a UI definition 150, and client systems 160A-N that render the UI definition 150 as a GUI. The developer system 110 may be a portable computing device, e.g., a laptop, a tablet, a phone, etc., or a non-portable computing device, e.g., a desktop computer.

The developer system 110 may include a UI developer application 112 that may be used by a developer to develop a UI expression 120. For example, the UI developer application 112 may be an integrated development environment (IDE) that enables a developer to create, modify, and test a UI expression 120. The UI developer application 112 may enable the developer to develop the UI expression 120 using text. For example, the UI developer application 112 may display the UI expression 120 in text to the developer and enable the developer to modify the text. In some implementations, the UI developer application 112 may enable the developer to develop the UI expression 120 graphically. For example, the UI developer application 112 may graphically represent portions of the UI expression 120, enable users to interact with the graphical representations, and generate text or a structured representation representing code for the UI expression 120 based on the user's interactions with the graphical representations.

The UI developer application 112 may enable a developer to provide the UI expression 120 to a server 140. For example, once the developer finishes developing a UI expression 120, the developer may instruct the UI developer application 112 to deploy the UI expression 120 to the server 140. The UI developer application 112 may then transmit the UI expression 120 to the server 140 over a network 130, e.g., an intranet or the Internet.

The server 140 may evaluate a UI expression 120 to generate a UI definition 150. The server 140 may receive the UI expression 120 from the developer system 110. The server 140 may store the received UI expression 120 in a UI expression database 146 and, when needed, may retrieve the UI expression 120 from the UI expression database 146.

The server 140 may include a UI expression evaluator 142 that may evaluate the UI expression 120 to generate the UI definition 150. The UI definition 150 may be structured data for rendering a GUI. For example, the UI definition 150 may include structured data in the form of XML, or other structured representations, that specify particular graphical elements to appear in a GUI. The UI definition 150 may be distinguishable from a UI expression 120 in that the UI definition 150 may be rendered without further evaluation of expressions as the UI definition 150 may not include variables or expressions.

The UI expression 120 may be evaluated based on a context. A context may specify values that affect the evaluation of a UI expression 120. For example, if the UI expression 120 specifies that a textual label may only appear if values of two variables are both even, the context for the UI expression 120 may specify the values of the two variables. Accordingly, when the UI expression 120 is evaluated, the result of the UI expression 120 may be based on the context. For example, if the context specifies that the value of the two variables are "2" and "6," which are both even, the evaluation of the UI expression 120 based on the context may result in a GUI in which the textual label appears. On the other hand, if the context specifies that at least one of the values of the two variables are odd, the evaluation of the UI expression 120 may result in a GUI in which the textual label does not appear.

The UI expression evaluator 142 may evaluate the UI expression 120 based on a context that is determined from an information database 144. For example, the UI expression evaluator 142 may determine that information about annual sales stored in an information database 144 should be used as a context for displaying annual sales, and further determine that to generate the UI definition 150, the UI expression 120 should be evaluated using the context.

The UI expression evaluator 142 may determine information to use for the context based on a request for information from the client systems 160A-N. For example, based on receiving a request from the client systems 160A-N for information on annual sales, the UI expression evaluator 142 may determine that information about annual sales stored in an information database 144 should be used as a context.

The UI expression evaluator 142 may update contexts based on event data 170 received from client systems 160A-N. The event data 170 may be data that specifies that a particular event has occurred that affects the context. For example, if the UI expression 120 specifies that the value of a text field should be saved as the value of the variable "username," the event data may specify that the value of the text field has changed to "george.washington." The UI expression evaluator 142 may receive the event data specifying that the value of the text field has changed to "george.washington" and update the value of the variable "username" to "george.washington." The UI expression evaluator 142 may then re-evaluate the UI expression 120 based on the updated context with the value "george.washington" for the variable "username" to generate an updated UI definition 150.

The event data may also specify a particular event that is not caused by a user. For example, if the UI expression 120 specifies that the UI expression 120 should be re-evaluated every ten seconds, the UI expression evaluator 142 may receive event data that specifies that ten seconds have passed since the last time the UI expression 120 was evaluated. The UI expression evaluator 142 may receive the event data and re-evaluate the UI expression 120. Re-evaluating a UI expression 120 in this case may be helpful when the UI expression 120 is based on something that may change even without a user's interaction with a rendered GUI. For example, the UI expression 120 may render a GUI that reflects the current value of a particular stock where the value shown in the GUI should be current by at least ten seconds.

The UI expression evaluator 142 may provide UI definitions 150 to client systems 160A-N. For example, the server 140 may receive requests for information from client systems 160A-N, determine a context and a UI expression 120 to evaluate to respond to the requests, evaluate the UI expression 120 based on the context to generate the UI definition 150, and provide the UI definition 150 to the client systems 160A-N.

For requests from different client systems 160A-N for the same information, the UI expression evaluator 142 may evaluate the same UI expression 120 using the same context and generate the same UI definition 150 for all client systems 160A-N. For example, the UI expression evaluator 142 may receive a request to view annual sales of a particular company from a first client system 160A and a second client system 160B, determine the same context based on information on the annual sales of the particular company, evaluate the same UI expression for generating a GUI for viewing annual sales to generate the same UI definition, and provide the same UI definition to both the first client system 160A and the second client system 160B. Accordingly, a developer may declaratively code a single UI expression 120 that may be used for all client systems 160A-N.

The client systems 160A-N may be portable computing devices, e.g., laptops, tablets, phones, etc., or non-portable computing devices, e.g., a desktop computers. While the system 100 is shown with four client systems 160A-N, the system 100 may include more or less client systems 160A-N. For example, the system 100 may include one client system or a hundred client systems. The client systems 160A-N may include displays, e.g., liquid crystal displays (LCDs) that display GUIs, and may be configured to receive input from users in response to the users using input devices (e.g., touch screens, touch pads, mice, or keyboards) to interact with the GUIs.

The client systems 160A-N may have different platforms. The first client system 160A corresponds to mobile platform A, e.g., the iOS operating system, the second client system 160B corresponds to mobile platform B, e.g., the Android operating system, the third client system 160C corresponds to a web browser platform, e.g., Internet Explorer, and the fourth client system 160N corresponds to an unspecified platform, e.g., platform N.

While the client systems 160A-N are all shown with different platforms, some or all of the client systems 160A-N may use the same type of platform. For example, the first client system 160A and the second client system 160B may both use mobile platform A or all the client systems 160A-N may use the web browser platform. In some implementations, a single client system may include multiple types of platforms. For example, the same desktop computer may be booted to load the Windows operating system or the Linux operating system.

The client systems 160A-N may each include a corresponding UI renderer 162A-N that is specific to the platform of the client system 160A-N. For example, the first client system 160A may include a UI renderer 162A for mobile platform A, the second client system 160B may include a UI renderer 162B for mobile platform B, the third client system 160C may include a UI renderer 162C for a web browser platform, and the fourth client system 160N may include a UI renderer 162N for platform N.

The UI renderers 162A-N may be native applications that render UI definitions as GUIs for the respective platforms of the client systems 160A-N. For example, the first UI renderer 162A may be a native application for mobile platform A that may render the UI definition 150 received from the server 140 as a GUI, the second UI renderer 162B may be a native application for mobile platform B that may render the UI definition 150 received from the server 140 as a GUI, etc.

As mentioned above, the UI definition 150 received by the client systems 160A-N may be the same. However, the different UI renderers 162A-N may render the same UI definition 150 differently. For example, from the same UI definition 150, the first UI renderer 162A may render a GUI that has six text fields arranged in a one cell wide by six cell tall grid, while the third UI renderer 162C may render a GUI that has six text fields arranged in a three cell wide by two cell tall grid. As another example, the first UI renderer 162A may render a date/time selector specified by the UI definition 150 with a calendar while the third UI renderer 162C may render the date/time selector specified by the UI definition 150 as a text field.

The different UI renderers 162A-N may render the same UI definition 150 differently because the client systems 160A-N may have different characteristics. For example, the first client system 160A may have a narrow touch screen while the third client system 160C may have a wider touch screen. Accordingly, the first UI renderer 162A may display a GUI with a taller grid because the first client system 160A may display more text fields at a time in a taller grid, and the third UI renderer 162C may display a GUI with a wider grid because the third client system 160C may display more text fields at a time in a wider grid. In another example, the first UI renderer 162A may render a date/time selector specified by the UI definition 150 with a calendar because the first client system 160A may natively support a date/time selection from a calendar while the third UI renderer 162C may render the date/time selector specified by the UI definition 150 as a text field because the third client system 160C may not natively support date/time selection from a calendar.

The UI renderers 162A-N may provide event data 170 to the server 140. For example, the UI renderers 162A-N may provide event data 170 to the server 140 that indicates that the user has input a new value into a text field in a GUI or that a pre-determined period of time has elapsed. The UI renderers 162A-N may determine when to provide event data 170 to the server 140 based on the UI definition 150. For example, the UI definition 150 may specify that event data 170 should be provided to the server 140 when a particular text field has changed or after a predetermined period of time has elapsed.

Figure 2A:
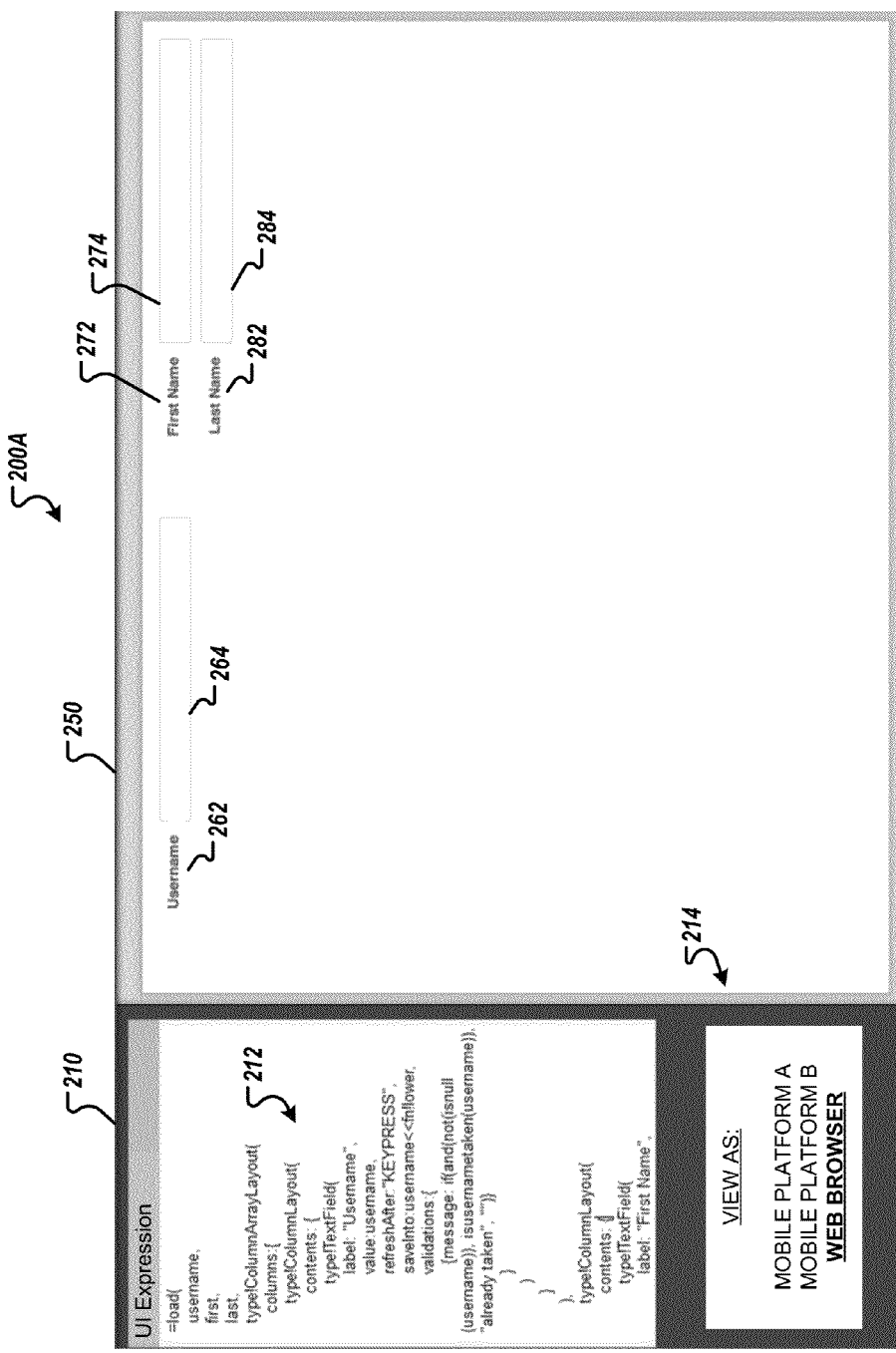
FIG. 2A is an example graphical user interface (GUI) for development of a UI expression.

FIG. 2A is an example graphical user interface (GUI) 200A for development of a UI expression 120. GUI 200A is explained in reference to system 100 described in FIG. 1. However, GUI 200A may be used with alternate systems or different configurations of system 100. The GUI 200A may be a GUI that is displayed on the developer system 110 by the UI developer application 112. The GUI 200A may include a design panel 210 on an upper left side of the GUI 200A, a platform selection panel 214 on the lower left side of the GUI 200A, and a preview panel 250 on the right side of the GUI 200A.

The design panel 210 may be a panel in which the developer may design a UI expression. For example, the design panel 210 may display a particular UI expression 212 that defines a GUI that may be used by users to select a username. The UI expression 212 may further specify behaviors of the GUI. For example, among other behaviors, the UI expression 212 may specify that each time a user of the GUI defined by the UI expression 212 presses a key when the focus of inputs is set to a text field 264 with the label 262 "Username," the text shown in the text field 264 may be put in lower case and set to the value of a variable "username," and that the UI expression 212 should be re-evaluated. In this particular implementation, the developer can type text into the design panel 210 to dynamically modify the UI expression.

The platform selection panel 214 may be a panel in which the developer may make a selection as to the type of platform for which the UI expression 212 shown in the design panel 210 should be rendered in the preview panel 250. For example, the platform selection panel 214 may provide a developer the option to preview a GUI rendered from the UI expression 212 for each of the different types of platforms on which the UI expression 212 may be rendered, e.g., "Mobile Platform A," "Mobile Platform B," and "Web Browser." While the selection is shown as being made in the form of individual links that may be clicked to be selected, the selection may also be in other forms, e.g., radio buttons, selectable icons, etc. As shown in GUI 200A, the option for "Web Browser" may be selected indicating that the UI expression 212 is to be previewed as if the UI expression 212 were being rendered on a client system with a "Web Browser" platform.

The preview panel 250 may display a preview of the UI expression 212. The preview of the UI expression 212 that is displayed in the preview panel 250 may be dependent on the selection made in the platform selection panel 214. For example, the preview panel 250 shown in GUI 200A may display the UI expression 212 rendered by a UI renderer for a web browser platform based on the selection of the option "Web Browser" in the platform selection panel 214.

To display the preview panel 250 of the UI expression 212, the UI developer application 112 may perform similar functionality as the UI expression evaluator 142 and the UI renderers 162A-N. For example, the UI developer application 112 may determine a context for the UI expression 212, evaluate the UI expression 212 based on the context to generate a UI definition 150, and render the UI definition 150 as a GUI. The particular GUI rendered in GUI 200A may include three text fields 264, 274, 284 with respective textual labels "Username" 262, "First Name" 272, and "Last Name" 282. The three text fields 264, 274, 284 may be arranged so that a first text field 264 labeled "Username" may be on the left side of the GUI, the second text field 274 labeled "First Name" may be on the right side of the GUI, and the third text field 284 labeled "Last Name" may be on the right side of the GUI below the second text field 274.

Figure 2B:
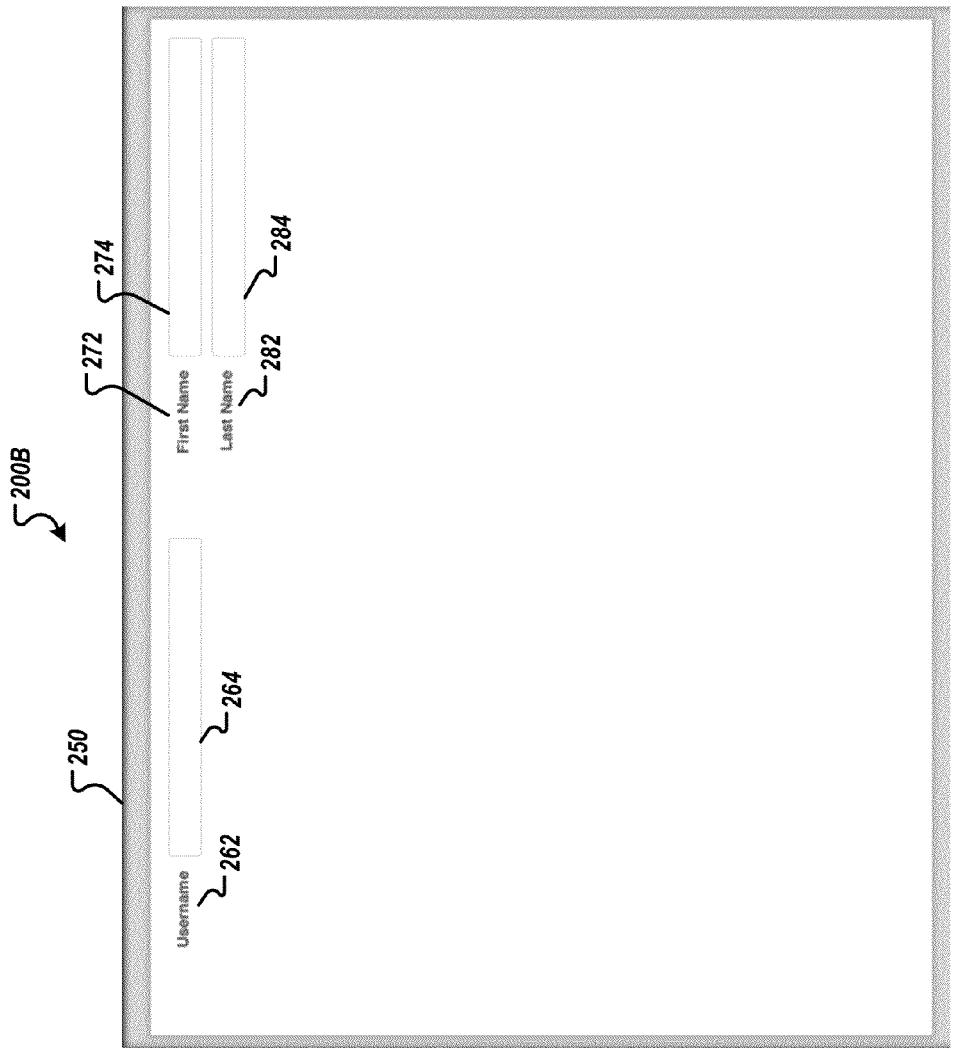
FIG. 2B is an example GUI rendered based on a UI expression.

FIG. 2B is an example GUI 200B rendered based on a UI expression. GUI 200B is explained in reference to system 100 described in FIG. 1. However, GUI 200B may be used with alternate systems or different configurations of system 100. For a particular UI expression, the GUIs that are rendered by UI renderers 162A-N on the client systems 160A-N may be the same GUIs that are rendered in the preview panel 250 of the UI developer application 112. For example, the GUI 200B that is rendered for the UI expression 212 on the client system 160C with "Web Browser" may be the same GUI that is rendered in the preview panel 250 of the GUI 200A that may be displayed by the UI developer application 112 when the selection for previewing the UI expression 212 for "Web Browser" is selected. However, the GUI 200B may be generated by the UI renderer 162C of the client system 160C so that the design panel 210 and UI expression 212 are not displayed. Accordingly, the users of the client systems 160A-N may use GUIs rendered by UI expressions without even realizing that the GUIs are rendered from UI expressions.

Figure 2C:
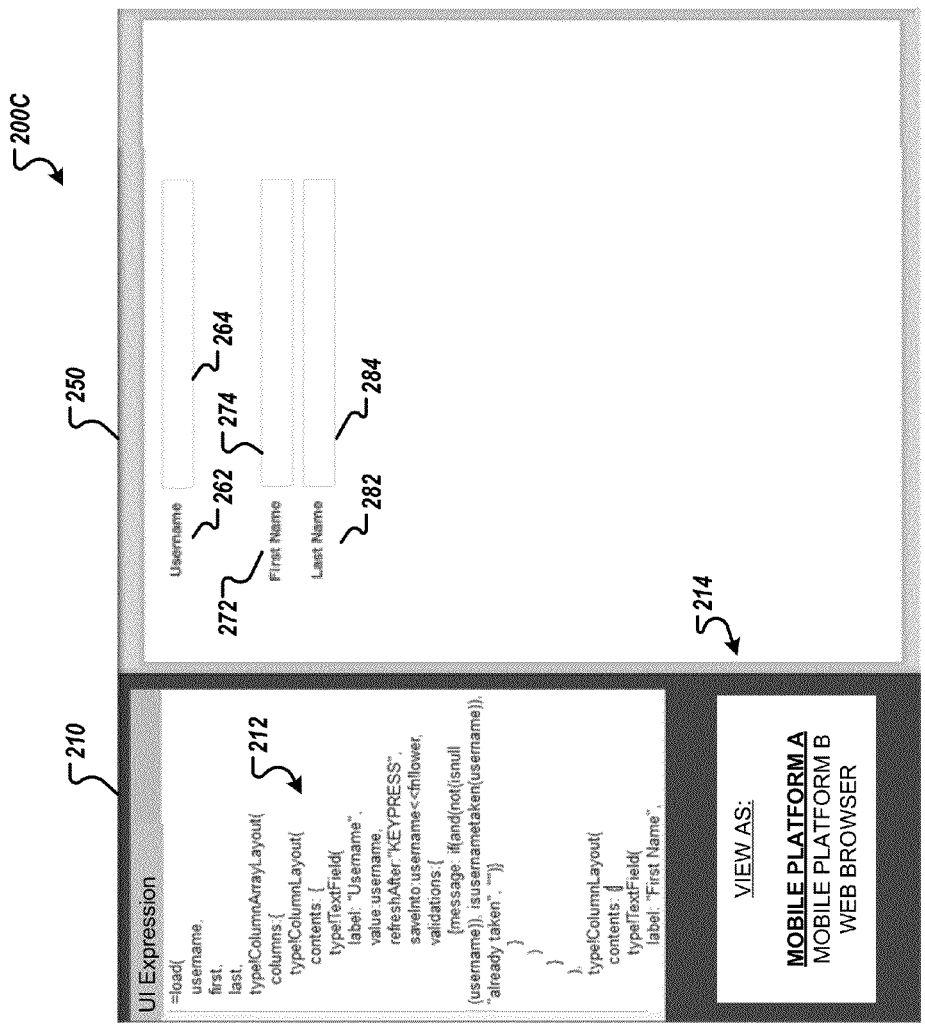
FIG. 2C is another example GUI for development of a UI expression.

FIG. 2C is another example GUI 200C for development of a UI expression. GUI 200C is explained in reference to system 100 described in FIG. 1. However, GUI 200C may be used with alternate systems or different configurations of system 100. As described above, the same UI expression 212 may be rendered as different GUIs based on the platform for which the UI expression 212 is rendered. For example, GUI 200C of the developer application 112 shows that when the option to preview the same UI expression 212 for "Mobile Platform A" is selected, the resulting GUI rendered in the preview panel 250 of GUI 200C is different than the GUI that that is rendered in the preview panel 250 of GUI 200A.

Specifically, the preview panel 250 for GUI 200C shows that while GUI 200C and GUI 200A may include the same graphical elements, e.g., the same text fields 264, 274, 284 and the same textual labels 262, 272, and 282, the text fields 264, 274, 284 in GUI 200C may appear in a one cell wide by three cell tall grid instead of a two cell wide by two cell tall grid as shown in GUI 200A.

The GUI 200 (as shown in FIGS. 2A and 2C) is a very powerful UI design tool in that it enables a software developer to create and modify a UI expression by typing into or otherwise interacting with the design panel 210 and then seeing immediately (or, in some implementations, in response to a selection of an "execute" graphical element or button in the design panel 210 of the GUI 200 (not shown)) the corresponding platform-specific rendered GUI in the preview panel 250. The rendered GUI in the preview panel 250 is the same or substantially the same GUI that will be rendered by the client systems. The developer is thereby able to interact directly with the GUI as it is being designed to obtain immediate feedback on any coding changes or additions that the developer makes using the design panel 210. This ability to see and interact with the GUI in the preview panel 250 while it is being designed is particularly useful in enabling the designer to properly structure the visual elements and the dynamism of the GUI.

FIG. 3 is an example UI expression 300. The UI expression 300 may be the same UI expression 212 that appears in FIGS. 2A and 2C in the design panel 210. As discussed above, the UI expression 300 may be a declarative code that defines a GUI in terms of the graphical elements that are to appear in a GUI and behaviors for the graphical elements. For example, the UI expression 300 may start with:

=load( which may specify that the UI expression 300 will define the variables that follow and will load their values from a context during re-evaluations.

The UI expression 300 may continue with:

username, first, last, which may specify that the UI expression 300 includes the variables "username," "first," and "last," all of which are initially set to a value of "NULL."

---

The UI expression 300 may continue with:
type!ColumnArrayLayout(
    columns:{
        type!ColumnLayout(
            contents: {

--- which may indicate what follows is a layout of columns of content, where the layout of the columns may be adjusted based on the platform that displays the GUI defined by the UI expression 300. For example, the first client system 160A may have a narrow touch screen and may display narrower columns on top of one another, while the third client system 160C may have a wide touch screen and may display wider columns side by side.

The UI expression 300 may continue with:

type!TextField( label: "Username", value:username, which may define a graphical element that is a first text field with the textual label "Username," where a value shown in the first text field is the value of the variable "username."

The UI expression 300 may follow with:

refreshAfter:"KEYPRESS"

which may define behavior corresponding to the first text field. "refreshAfter" may be a variable indicating when the UI expression 300 should be re-evaluated based on input to the first text field. The values of "refreshAfter" may be "KEYPRESS" or "ONBLUR." "KEYPRESS" may indicate that the UI expression 300 is to be re-evaluated every time a key is pressed in relation to a text field. For example, the UI expression 300 may be re-evaluated when a user presses "G" to add "G" to the value of the text field. "ONBLUR" may indicate that the UI expression 300 is to be re-evaluated every time a text field is put into focus, the value shown in the text field is modified, and the focus is then changed away from the text field. For example, the UI expression may be re-evaluated when the text field is selected (e.g., clicked on using a mouse), the user types "George.Washington," and the text field is then deselected (e.g., clicked away from using the mouse). Where the value for "refreshAfter" is not specified, "refreshAfter" may be set to "ONBLUR" by default. The same value of "refreshAfter" may be handled differently for different platforms 160A-N. For example, "ONBLUR" for a client system 160C with a web browser platform may cause re-evaluation of the UI expression 300 when the "TAB" button of a keyboard is pressed and "ONBLUR" for a client system 160A for Mobile Platform A may cause re-evaluation of the UI expression 300 when a particular area of a touch screen of the client system 160A is pressed.

Through use of the "refreshAfter" parameter, a software developer is given a tremendous amount of control over the dynamism of the UI at a very granular level. The "refreshAfter" parameter may be set for each UI element that receives user input such that the UI developer may thereby tailor the frequency of the updating of the UI (either the updating of the entire UI or the updating of only selected portions of the UI that are impacted by the input) to each particular UI user input element. For example, a single UI may include two UI user input elements that each have a "refreshAfter" parameter that is set to "KEYPRESS," thereby triggering a re-evaluation of the UI expression and consequent updating of the UI after each keypress of input is provided to these input elements. The single UI may additionally include four other UI user input elements for which the corresponding "refreshAfter" parameters have not been specified, resulting in each of these four other UI user input elements having its corresponding "refreshAfter" parameter set by default to "ONBLUR."

While the "refreshAfter" parameter has been described with respect to a user using a keyboard (real or virtual) to provide user textual input into text fields, in some implementations, the parameter is additionally or alternatively applicable to a user using different types of input mechanisms to provide different types of input into different types of UI user input elements. For example, if the user input mechanism is a mouse or a touch pad/screen and the UI user input element is a graphical widget, the value of the "refreshAfter" parameter of the UI user input element may be set to a value that triggers a re-evaluation of the UI expression and, hence, an updating of the UI in response to particular types of manipulations of the widget made by the user through use of the mouse or touchpad/screen. For example, every time a pointer is initially positioned over the graphical widget and then moved by the user a predetermined distance (e.g., 15 pixels) through interaction with the touchpad/screen or mouse in a single swipe, a re-evaluation may be triggered. In some implementations, the predetermined distance may be limited to a particular direction (e.g., vertical or horizontal) and/or a particular user-created gesture (e.g., moving the pointer or touching the screen/pad in a circular pattern). In some implementations, the UI expression is additionally or alternatively re-evaluated when a pointer is positioned over the graphical widget and the user depresses a button on a touchpad/screen or mouse to thereby click on the graphical widget. In some implementations, the re-evaluation is only triggered when a sequence of one or more buttons are pressed by the user (e.g., a double right mouse button click, a single left mouse button click, both left and right mouse buttons are clicked). In some implementations, the re-evaluation is only triggered when a sequence of one or more buttons are pressed by the user in combination with one or more gestures (e.g., a circular pattern followed by a right mouse/touchpad button click).

In some implementations, the value or values assigned to the "refreshAfter" parameter may indicate more than one way that a re-evaluation of the UI expression can be triggered. For example, a re-evaluation may be triggered if the user clicks on the UI user input element using the right mouse or touchpad button OR if the user moves a pointer that is initially positioned on the UI user input element to a location off of the UI user input element. In this example, the "refreshAfter" parameter may be assigned two values. For example, it may be assigned the value "ONRIGHTCLICK" and the value "ONANDOFF."

Referring back to FIG. 3, after assigning the value "KEYPRESS" to the "refreshAfter" parameter of the first text field, the UI expression 300 may follow with:

saveInto:username<<fn!lower, which may indicate that before the UI expression 300 is re-evaluated, the value shown in the first text field should be sent to the function "lower," which is a function that changes text to lower case, and the lower case text should be saved as the value for the variable "username" to update the context for re-evaluating the UI expression 300. For example, this portion of the UI expression 300 may specify that if the text field is initially blank and a user enters "G" in the text field, lower case "g" should be determined based on "G" and stored as the value of the variable "username," updating the context.

The UI expression 300 may continue with:
validations: {
   {message: if(and(not(isnull(username)), isusernametaken(username)), "already taken", " ")} which may indicate that when the UI expression 300 is evaluated, a validation may take place for the first text field. The validation specified may be that the message "already taken" should be displayed in relation to the text field if the value of the variable "username" is not null and the result of the function "isusernametaken" based on the value of the variable "username" is true. The function "isusernametaken" may return true when a username already exists for the value provided to the function and may return false when a username does not already exist for the value provided to the function. Accordingly, if the value of the variable "username" is "g," the function "isusernametaken" may return false if the username "g" is not already taken so the message "already taken" does not appear in the GUI rendered based on the UI expression 300.

The UI expression 300 may follow with:
type!TextField(
  label: "First Name",
  value:if(isnull(first),proper(index(split(username, "."), 1, " ")),first),
  refreshAfter:"ONBLUR",
  saveInto:first
), which may indicate a second text field that is labeled "First Name" where the value of the second text field after evaluation of the UI expression 300 is the value of the variable "first" if the value is not null, and if the value of the variable is null, the value of the second text field shown is the capitalized portion of the value of the variable "username" preceding the first "." The function "proper" may capitalize the first letter of text provided to the function. For example, if the value of the variable "first" is null and the value of "username" is "george.washington," when the UI expression 300 is evaluated the value of the second text field labeled "First Name" will be "George." In another example, if the value of the variable "first" is "George" and the value of the username is "thomas.jefferson," when the UI expression 300 is evaluated the value of the second text field labeled "First Name" may be "George." The value of the second text field may remain unchanged to prevent automatically overriding the value of the second text field once the second text field has a non-null value.

"refreshAfter:'ONBLUR'" may indicate that the UI expression 300 should only be re-evaluated based on changes to the second text field when the second text field receives focus, a change is made to the value of the second text field, and the second text field loses focus. "saveInto:first" may indicate that before re-evaluation, the value of the second text field should be saved as the value of the variable "first." For example, if "George" is shown as the value of the second text field and is then replaced with "Thomas," the value of the variable "first" may be changed from "George" to "Thomas" and the UI expression 300 may be re-evaluated.

The UI expression 300 may follow with:
type!TextField(
  label: "Last Name",
  value:if(isnull(last),proper(index(split(username, "."), 2, " ")),last),
  saveInto:last
), which may indicate a third text field that is labeled "Last Name" and when the UI expression 300 is evaluated, the value of the third text field shown is the value of the variable "last" if the value is not null, and if the value of the variable is null, the value of the third text field is the capitalized portion of the value of the variable "username" following the first "." and before any other following "." For example, if the value of the variable "last" is null and the value of "username" is "george.washington," when the UI expression 300 is evaluated the value of the third text field labeled "Last Name" will be "Washington." In another example, if the value of the variable "last" is "Washington" and the value of the username is "thomas.jefferson," when the UI expression 300 is evaluated the value of the third text field labeled "Last Name" is still "Washington." "saveInto:last" may indicate that the value of the third text field should be saved as the value of the variable "last." As the third text field does not have a value of "refreshAfter" defined, the third text field may indicate that the UI expression 300 should be re-evaluated with the default of as if the third text field had "refreshAfter=ONBLUR."

As mentioned above, the UI expression 120 may instead be structured data in the form of extensible markup language (XML). For example, the following XML may be an alternate representation of the UI expression 300:

```
<userAccount xsi:type="load">
    <username />
    <first />
    <last />
    <expression xsi:type="ColumnArrayLayout">
        <columns>
            <item>
                <contents>
                    <item xsi:type="TextField">
```

```xml
            <label>Username</label>
            <value xsi:type="LocalVariable">username</value>
            <refreshAfter>KEYPRESS</refreshAfter>
            <saveInto>
               <destination xsi:type="LocalVariable">username</destination>
               <transform xsi:type="lower">
                  <text xsi:type="Deferred"/>
               </transform>
            </saveInto>
            <validations>
               <item>
                  <message xsi:type="if">
                     <condition xsi:type="and">
                        <predicate xsi:type="not">
                           <predicate xsi:type="isnull">
                              <value xsi:type="LocalVariable">username</value>
                           </predicate>
                        </predicate>
                        <predicate xsi:type="isusernameTaken">
                           <username xsi:type="LocalVariable">username</username>
                        </predicate>
                     </condition>
                     <iftrue>already taken</iftrue>
                     <iffalse></iffalse>
                  </message>
               </item>
            </validations>
         </item>
      </contents>
   </item>
   <item>
      <contents>
         <item xsi:type="TextField">
            <label>First Name</label>
            <value xsi:type="if">
               <condition xsi:type="isnull">
                  <value xsi:type="LocalVariable">first</value>
               </condition>
               <iftrue xsi:type="proper">
                  <text xsi:type="index">
                     <array xsi:type="split">
                        <text xsi:type="LocalVariable">username</text>
                        <separator>.</separator>
                     </array>
                     <index>1</index>
                     <default />
                  </text>
               </iftrue>
               <iffalse xsi:type="LocalVariable">first</iffalse>
            </value>
            <refreshAfter>ONBLUR</refreshAfter>
            <saveInto xsi:type="LocalVariable">first</saveInto>
         </item>
         <item xsi:type="TextField">
            <label>Last Name</label>
            <value xsi:type="if">
               <condition xsi:type="isnull">
                  <value xsi:type="LocalVariable">last</value>
               </condition>
               <iftrue xsi:type="proper">
                  <text xsi:type="index">
                     <array xsi:type="split">
                        <text xsi:type="LocalVariable">username</text>
                        <separator>.</separator>
                     </array>
                     <index>2</index>
                     <default />
                  </text>
               </iftrue>
               <iffalse xsi:type="LocalVariable">last</iffalse>
            </value>
            <saveInto xsi:type="LocalVariable">last</saveInto>
         </item>
      </contents>
   </item>
  </columns>
 </expression>
</userAccount>
```

Figure 4A:
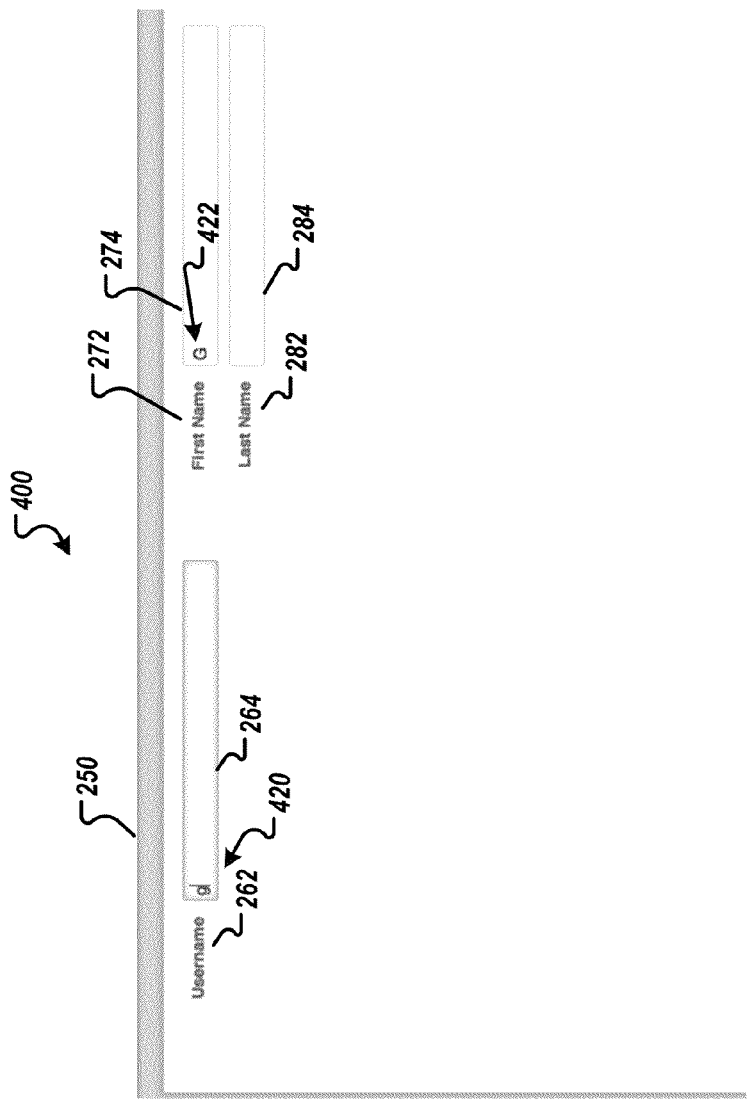
FIG. 4A is an example GUI rendered based on a UI expression showing a result from input from a user.

FIG. 4A is an example GUI 400 rendered based on a UI expression showing a result from input from a user. The GUI 400 is explained in reference to system 100 described in FIG. 1. However, the GUI 400 may be used with alternate systems or different configurations of system 100.

Specifically, the GUI 400 may be rendered after a user inputs "G" into the first text field 264 of GUI 200B shown in FIG. 2B. The UI expression rendered in GUI 400 may be rendered based on the evaluation of the UI expression 300 shown in FIG. 3, which may also be the same UI expression that is evaluated to render GUI 200B shown in FIG. 2B.

The text fields 264, 274, 284, in GUI 400 may have different values from the text fields 264, 274, 284 shown in GUI 200B. For example, the first text field 264 and the second text field 274 in GUI 400 may show the text "g" 420 and "G," 422 respectively, and the first text field 264 and the second text field 274 in GUI 200B may be blank. The GUI 400 may have different values in the text fields 264, 274, 284, because the context that the UI expression 300 is evaluated for rendering GUI 400 may be different from the context that the same UI expression 300 is evaluated for rendering GUI 200B. For example, in evaluating the UI expression 300 for GUI 400, the value of the variable "username" may be "g," while in evaluating the UI expression 300 for GUI 200B, the value of the variable "username" may have been null.

The context may be different because a user may have typed in "G" into the first text field 264 of the GUI 200B, which may have resulted in the value of the variable "username" being changed to the value "g" and a re-evaluation based on the updated context. More specifically, as discussed above, the UI expression 300 may indicate, e.g., by "refreshAfter=KEYPRESS," that upon a change in a value of the first text field 264, the value of the variable "username" should be set to the lower case of the value shown in the first text field 264 and the UI expression 300 should be re-evaluated based on the updated context. For example, from the GUI 200B, if the user inputs "G" into the first text field 264, "G" may be made lower case to "g," then the value of the variable "username" may be set to "g," and then the UI expression 300 may be re-evaluated using "g" as the value of variable "username," which results in the letter "g" appearing in the field 264.

Also as discussed above, the UI expression 300 may define that the second text field 274 may have a value of the variable "first" if the value is not null, and if the value is null, is the capitalized portion of the value of the variable "username" preceding the first "." Accordingly, as the value of the variable "username" may be "g" and the value of the variable "first" may be null, the value of the second text field 274 may show "G."

Figure 4B:
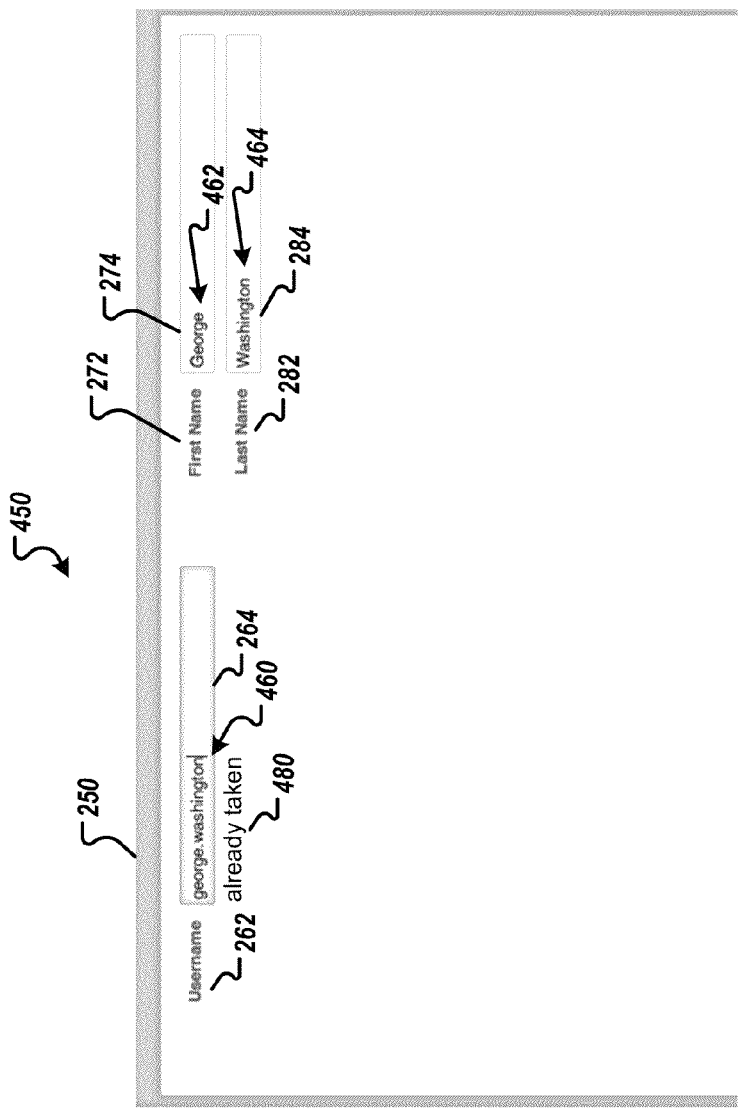
FIG. 4B is another example GUI rendered based on a UI expression showing another result from other input from a user.

FIG. 4B is another example GUI 450 rendered based on a UI expression showing another result from other input from a user. The GUI 450 is explained in reference to system 100 described in FIG. 1. However, the GUI 450 may be used with alternate systems or different configurations of system 100. Specifically, the GUI 450 may render the resulting GUI after a user inputs "George.Washington" 460 into the first text field 264 of GUI 200B shown in FIG. 2B. The GUI 450 may be rendered based on evaluating the UI expression 300 shown in FIG. 3, which may also be the same UI expression 300 that is evaluated to render the GUI 200B shown in FIG. 2B.

The text fields 264, 274, 284 in the GUI 450 may have different values from the text fields 264, 274, 284 shown in the GUI 200B, and the GUI 450 may also include a message "already taken" 480 for the first text field 264 that does not appear in the GUI 200B. For example, the text fields 264, 274, and 284 in the GUI 400 may show the text "george.washington" 460, "George" 462, and "Washington" 464, respectively, and the text fields 264, 274, and 284 in the GUI 200B may be blank. The GUI 450 may be different from the GUI 200B because the context that the UI expression 300 is evaluated for the GUI 450 may be different from the context that the same UI expression 300 is evaluated for the GUI 200B. For example, in evaluating the UI expression for the GUI 450, the value of the variable "username" may be "george.washington," while in evaluating the UI expression for the GUI 200B, the value of the variable "username" may have been null.

The GUI 450 may be arrived at from the GUI 200B based on a user inputting "George.Washington" into the first text field 264 shown in GUI 200B. As discussed above, the UI expression 300 may define that the first text field 264 is associated with validation. The validation specified may be that the message "already taken" should be displayed in relation to the text field if the value of the variable "username" is not null and the result of the function "isusernametaken" based on the value of the variable "username" is true. For example, in evaluating the UI expression 300, the validation may determine that the value "george.washington" of the variable "username," is already taken as a username and display the message "already taken." Similarly, as discussed above for the GUI 400, the values shown in text fields 274 and 284 may also be evaluated based on the value of the variable "username." The function "isusernametaken" may involve the server 140 accessing the information database 144 to determine the usernames that are already registered. However, in terms of developing the UI expression 300, how the function "isusernametaken" is evaluated may be unimportant and the developer may not even be aware that to evaluate the function the server 140 will access the information database 144 to determine if the username is already taken.

Figure 5:
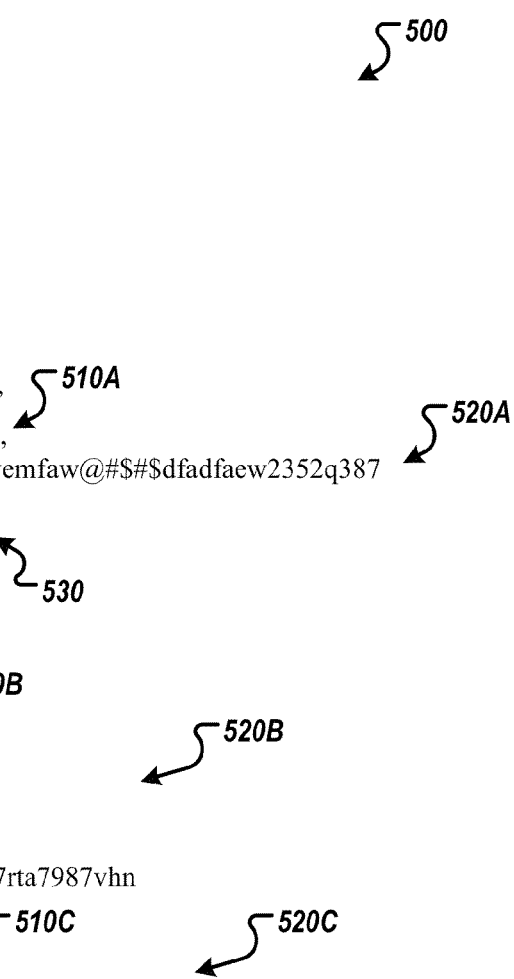
FIG. 5 is an example UI definition.

FIG. 5 is an example UI definition 500. The UI definition 500 may be generated based on evaluation of the UI expression 300 by the UI expression evaluator 142 using a context where the variable "username" has a value of "george.washington" and the user name of "george.washington" is already taken. The UI definition 500 may appear similar to the UI expression 300 it is generated from, with some particular differences 510A-C, 520A-B, and 530.

The first set of differences 510A-C may be that there are no variables in the UI definition 500. For example, instead of the values of each text field referencing a particular variable, e.g., "value: username," the values of each of the text fields may reference an explicit value, e.g., "george.washington" 510A, "George" 510B, and "Washington" 510C.

Furthermore, because there may be no variables in the UI definition 500, instead of expressions following "saveInto," e.g., "saveInto:username <<fn!lower," "saveInto" may be followed by pointers 520A-C to particular portions of a UI expression 300. For example, the pointer 520A "@#$%@#$azflijwemfaw@#$#$dfadfaew2352q387" may point to "username <<fn!lower" in the UI expression 300.

A pointer may be a reference to a particular location in a UI expression. The pointers 520A-C may reference particular locations so that the UI expression evaluator 142 may determine how to update the context. For example, the UI expression evaluator 142 may receive event data specifying that the value in the first text field is now "G" and a pointer indicating that the event data should be processed according to the portion of UI expression 300 that corresponds to the location for "saveInto:username <<fn!lower." In using a pointer, the UI expression evaluator 142 may use the context to evaluate the expression at the location identified by the pointer. The expression at the location identified by the pointer may be expected to evaluate to an update directive which may then be executed to produce an updated context prior to the re-evaluation of the UI expression. In technical terms, the combination of the prior context and the pointer may be equivalent to a functional closure and may be implemented as such in some implementations.

The pointers 520A-C may also be encrypted. Encrypting the pointers may provide confidentiality when UI definitions are exchanged over a network. For example, in replacing the variables and functions for processing the variables, the UI expression 300 may remain confidential as the client systems 160A-N may not receive information about the UI expression 300 itself. Alternatively or additionally, encrypting the pointers may provide integrity. For example, encrypting the pointers 520A-C may prevent the UI expression evaluator 142 from rendering UI definitions where the pointers may have been set to identify arbitrary locations in the expressions, which may be used maliciously to perform unintended operations, as a malicious client of the system may not be able to be properly encrypt the pointers.

Figure 6:
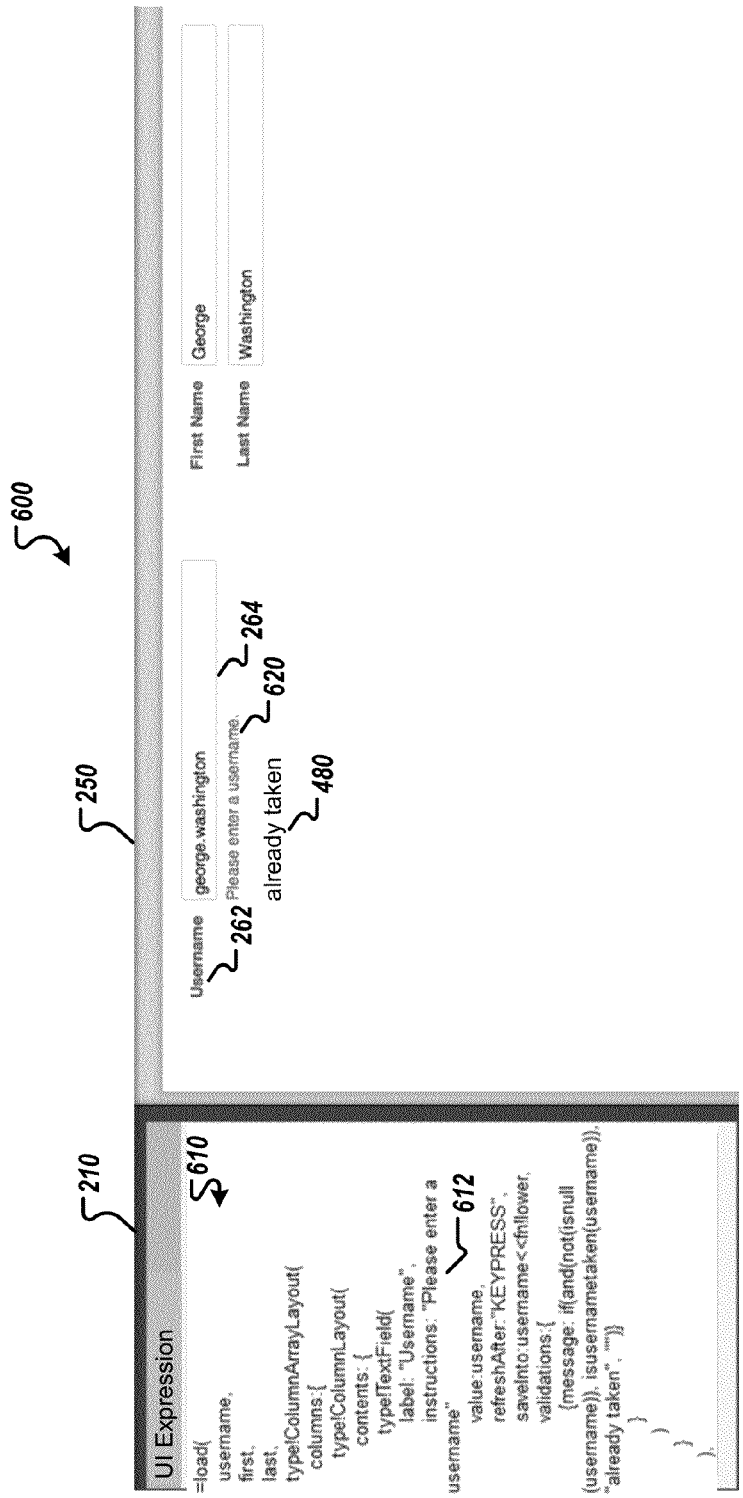
FIG. 6 is another example GUI for development of another UI expression.

FIG. 6 is another example GUI 600 for development of another UI expression. The GUI 600 is explained in reference to system 100 described in FIG. 1. However, the GUI 600 may be used with alternate systems or different configurations of system 100.

While the previous GUIs showed how the same UI expression 300 may result in different GUIs based on either the context that the UI expression 300 is evaluated with or the platform on which the UI definition is rendered, the GUI 600 shows that changing a UI expression 300 may also change the GUI that is rendered, even when the context is not changed and the platform is not changed. GUI 600, therefore, shows the immediate feedback noted previously with respect to GUI 200 that is provided to the software developer in response to the software developer interacting with the design panel 210 to change the coding of the UI expression.

The GUI 600 may be similar to the GUI 450 shown in FIG. 4B, except that the UI expression 610 shown in the design panel 210 of the GUI 600 has been modified by the software developer. In particular, the UI expression 610 has been modified to include, for the first text field 264, the additional code 612:

instructions: "Please enter a username.", which may specify that the instructions "Please enter a username." should appear in relation to the first text field 264. As shown in the preview panel 250 of the GUI 600, when the UI expression 610 is rendered, the instructions "Please enter a user name" 620 appears.

Figure 7:
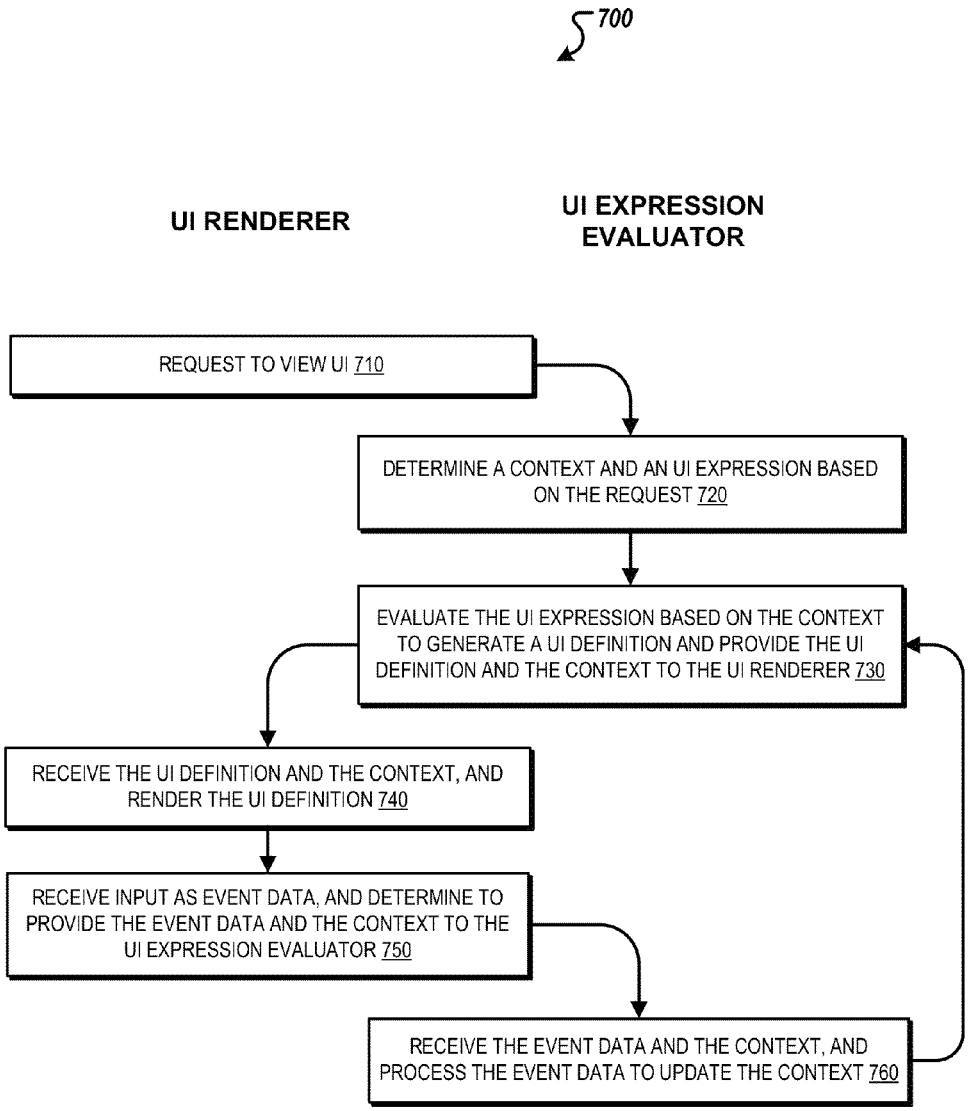
FIG. 7 is a flowchart illustrating an example of a process for a UI renderer and a UI evaluator to provide a GUI rendered based on a UI expression.

FIG. 7 is a flowchart illustrating an example of a process 700 for a UI renderer and a UI expression evaluator to provide a GUI rendered based on a UI expression. The process 700 may be performed by components of the system 100. For example, the UI renderer may be the UI renderer 162A on the client system 160A and the UI expression evaluator may be the UI expression evaluator 142 on the server 140. The following describes the process 700 as being performed by components of system 100. However, the process 700 may be performed by other systems or system configurations.

The UI renderer 162A may provide the UI expression evaluator 142 a request to view a user interface (710). For example, the UI renderer 162A may provide the UI expression evaluator 142 a request to view the annual sales of "Company X." The UI renderer 162A may provide the request in response to input from a user.

For example, when a user opens the UI renderer 162A on the client system 160A, the user may first provide log in credentials (e.g., a username and password). Once the user logs in, the UI renderer 162A may determine the information that the user may view. For example, the UI renderer 162A may determine that the user may be authorized to view particular reports. One of the reports may be a report on the annual sales of "Company X." The UI renderer 162A may then receive a selection from the user to view the annual sales of "Company X." Based on receiving the selection from the user, the UI renderer 162A may then provide the UI expression evaluator 142 a request to view a user interface for a report on the annual sales of "Company X." In another example, the report on the annual sales of "Company X" may be open to the public and the UI renderer 162A may allow users to select to view the report without providing log in credentials.

The UI expression evaluator 142 may determine a context and a UI expression based on the request (720). For example, the UI expression evaluator 142 may determine a particular UI expression used to generate UI's for reporting annual sales and determine the context that should be used to evaluate the particular UI expression to generate a UI reporting the annual sales of "Company X."

The UI expression evaluator 142 may determine the context and the UI expression based on first determining information from the information database 144 that corresponds to the request and may be used as the context. For example, the UI expression evaluator 142 may request information on the annual sales of "Company X" from the information database 144 and the requested information may be used as a context.

The information that the UI expression evaluator 142 requests may have associated metadata that may be used to determine the UI expression that should be evaluated for the context. For example, the information on the annual sales of "Company X" may have associated metadata that identifies that a particular UI expression for generating a GUI for reporting annual sales may be used to generate a GUI for the information on the annual sales of "Company X."

The UI expression evaluator 142 may evaluate the UI expression based on the context to generate a UI definition and provide the UI definition and the context to UI renderer (730). For example, the UI expression evaluator may evaluate the UI expression 300 shown in FIG. 3 based on a context where the value of variable username is "george.washington" and the values of variables first and last are "NULL" to generate the UI definition 500 shown in FIG. 5.

To evaluate the UI expression, the UI expression evaluator 142 may replace all variables in the UI expression with the value of the variables for the context and evaluate the result of all expression within the UI expression to generate the UI definition. For example, for a UI expression that includes the expression:

value:if(isnull(first),proper(index(split(username, "."), 1, " ")),first), and a context with value of variable "first" as "NULL" and the value of variable "username" as "george.washington," a replacement of the variables may result in the expression:

value:if(isnull(NULL),proper(index(split("george.washington", "."), 1, " ")),NULL), which may be evaluated to result in "value:'george'." "value:'george'" may then be included in the UI definition that is generated from the evaluation of the UI expression.

The UI expression evaluator 142 may provide (i) the UI definition generated from the evaluation of the UI expression based on the context and (ii) the context, to the UI renderer 162A (730). For example, UI expression evaluator 142 may provide the UI definition and the context specifying that the variable "username" has value of "george.washington" and the variables "first" and "last" have the values of "NULL," to the UI renderer 162A.

The UI expression evaluator 142 may provide the UI renderer 162A the context upon initialization and every subsequent re-evaluation. The UI renderer 162A may also provide the context back to the UI expression evaluator 142 upon re-evaluation, because the UI expression evaluator 142 may not track the contexts for the UI renderers 162A-N. For example, after the UI expression evaluator 142 provides the UI definition and the context to the UI renderer 162A, the UI expression evaluator 142 may delete the context. The UI expression evaluator 142 may delete the context as the deletion may free up resources. The UI renderer 162A may then provide the context back to the UI expression evaluator 142 upon re-evaluation if it is aware that the server may not be tracking the context. However, in some implementations, the UI expression evaluator 142 may track the context so it may not delete the context and the UI renderer 162A may not need to provide the context to it.

The UI expression evaluator 142 may also provide the context to the UI renderer 162A in an encrypted manner so that the UI renderer 162A may not decrypt the context. For example, the UI expression evaluator 142 may encrypt the context in manner so that only the UI expression evaluator 142 may decrypt the context. The UI expression evaluator 142 may encrypt the context to ensure that the context may only be viewed and modified by the UI expression evaluator 142.

The UI renderer 162A may receive the UI definition and the context, and render the UI definition (740). For example, the UI renderer 162A may render the GUI 600 based on the UI definition. The UI renderer 162A may determine how the UI definition is to be rendered. For example, the UI renderer 162A may determine the appearance and location of each graphical element included in the UI definition should be rendered in a particular way for the client system 160A with "Mobile Platform A."

The UI renderer 162A may receive input as event data, and determine to provide the event data and the context to the UI expression evaluator 142 (750). For example, the UI renderer 162A may receive a user input into a text field, determine to provide (i) the event data indicating the user input into the text field and (ii) the context, to the UI expression evaluator 142 on the server 140. In another example, the UI renderer 162A may determine that a pre-determined length of time has passed and provide (i) event data indicating the pre-determined length of time has passed and (ii) the context, to the UI expression evaluator 142 on the server 140. The event data may also include the pointer in the UI definition corresponding to the graphical element that the event data corresponds. For example, the event data may include the user input of "G" and also a pointer indicating that the user input "G" is for a location that corresponds to a first text field of a particular UI expression.

The UI expression evaluator 142 may receive the event data and the context, and process the event data to update the context (760). For example, the UI expression evaluator 142 may receive event data that indicates that a user has input "G" into the first text field of a particular UI expression and receive an encrypted context with which the particular UI expression was evaluated.

The UI expression evaluator 142 may then decrypt the context and process the event data. For example, the UI expression evaluator 142 may process the event data that indicates that a user has input "G" into the first text field of a particular UI expression by determining that the event data is referencing the code "saveInto:username<<fn!lower," that the user input is "G" and should be processed by the function "lower," and that the output of the function should be stored as the value of the variable "username." The storing of the new value in the variable "username" may update the context for the UI expression.

The process 700 may then repeat with the UI expression evaluator 142 re-evaluating the UI expression based on the updated context to generate a UI definition and provide the UI definition and the context to the UI renderer (730). For example, the UI expression evaluator 142 may generate the UI definition 500 shown in FIG. 5 after a user types "george.washington" into the first text field 264 of the GUI 200B shown in FIG. 2B and the UI expression evaluator 142 may update the context by updating the value of the "username" to "george.washington."

Figure 8:
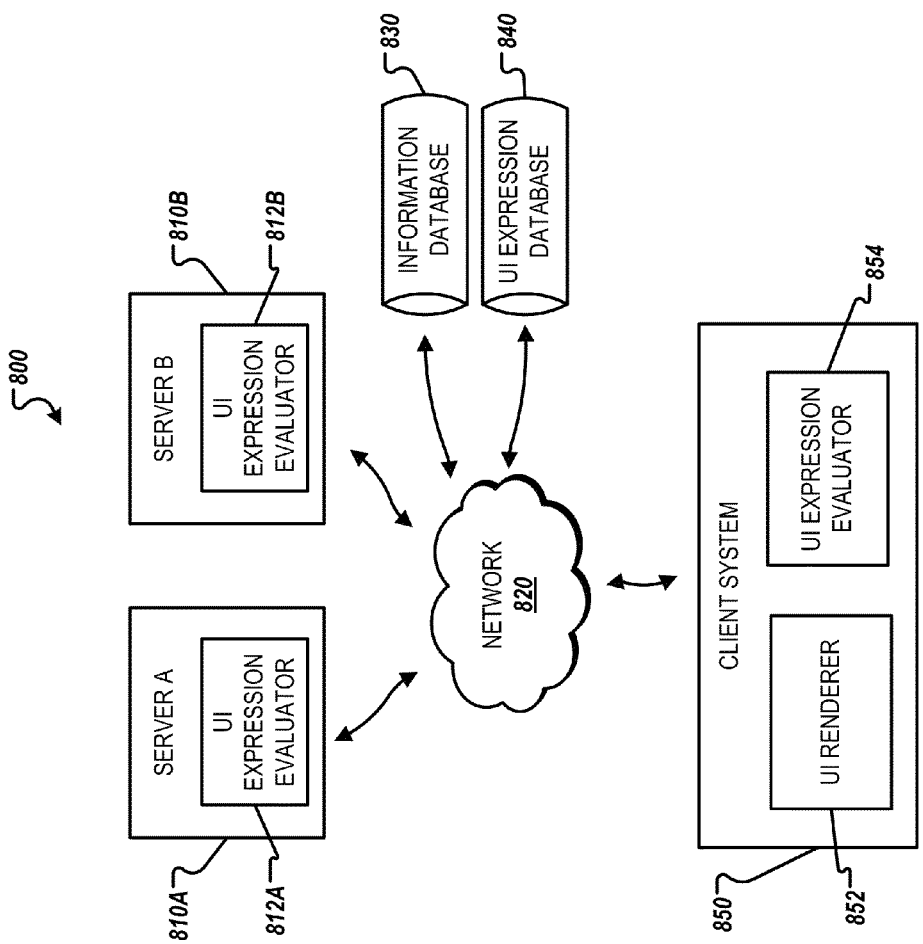
FIG. 8 illustrates an example system that enables use of UI expressions through distributed evaluation of the UI expressions.

FIG. 8 illustrates an example system 800 that enables use of UI expressions through distributed evaluation of the UI expressions. The system 800 may function similarly to the system 100, except for that evaluation of a particular UI expression in system 800 may be distributed to occur on one or more servers 810A-B and one or more client systems 850. Distributed evaluation of UI expressions may be useful for increasing the speed at which UI expressions may be evaluated, which may make GUIs that are rendered from UI expressions appear to be more responsive. For example, latency caused by network communications with servers 810A-B may be eliminated for evaluations of expressions that may be performed entirely on the client system 850. In another example, parallel evaluation of a UI expression by multiple UI expression evaluators may speed up the evaluation of the UI expression.

The servers 810A-B may include UI expression evaluators 812A-B that function similarly to the UI expression evaluator 142 described for system 100, except for at least two differences. First, the UI expression evaluators 812A-B may function together to evaluate a UI expression. For example, a UI expression may be a particularly complicated UI expression that may be evaluated in parallel.

Accordingly, a first UI expression evaluator 812A of a first server 810A may evaluate a first portion of a UI expression and the second UI expression evaluator 812B of a second server 810B may evaluate a second portion of the UI expression, in parallel. In another example of parallel processing, the UI expression may include multiple functions that request information for multiple databases in a hierarchical structure where one branch describes requesting information from a first database and a second branch describes requesting information from a second database. Accordingly, the requests for information from databases may be independent from one another and may be performed in parallel where the first server 810A evaluates the first branch and the second server 810B evaluates the second branch.

The partial results of the evaluations by the UI expression evaluators 812A-B may be combined to form a UI definition. In some implementations, one of the servers 810A-B may combine the partial results of the evaluations to form the UI definition and provide the formed UI definition to the client system 850. In other implementations, the client system 850 may combine the partial results of the evaluations to form the UI definition.

Second, the UI expression evaluators 812A-B on the servers 810A-B may collaborate with a UI expression evaluator 854 on the client system 850. The UI expression evaluators 812A-B may receive an indication of the evaluation availability of the UI expression evaluator 854 on the client system 850. The evaluation availability may indicate the type of expressions that the UI expression evaluator 854 is capable of evaluating. For example, the evaluation availability may indicate the functions that the UI expression evaluator 854 can evaluate. In another example, the evaluation availability may identify the platform that the UI expression evaluator 854 on the client system 850 is for. The UI expression evaluators 812A-B on the servers 810A-B may then identify the known capabilities of UI expression evaluators for the identified platform.

The UI expression evaluator 854 of the client system 850 may have different evaluation capabilities which may be supplemented by the evaluation capabilities of one or more UI expression evaluators 812A-B on the servers 810A-B. For example, the client system 850 may be a mobile phone that has low processing capabilities and the UI expression evaluator 854 of the client system 850 may be unable to evaluate particular expressions that are processing intensive. On the other hand, the servers 810A-B may have high processing capabilities and the UI expression evaluators 812A-B of the servers 810A-B may be able to evaluate particular expressions that are processing intensive.

In another example, the servers 810A-B and client system 850 may have access to different data. For example, evaluating the function "isusernametaken" may involve accessing a database of registered user names that is accessible by the server 810A-B and is not accessible by the client system 850. Accordingly, because the client system 850 may not be able to evaluate the function "isusernametaken," the servers 810A-B may evaluate the function "isusernametaken." In yet another example, evaluating a function may involve determining a current location of the client system 850 using a global positioning system (GPS) sensor of the client system 850 where the servers 810A-B may not have access to the current location of the client system 850. Accordingly, because the servers 810A-B may not be able to evaluate the function, the client system 850 may evaluate the function.

Accordingly, the UI expression evaluators 812A-B on the servers 810A-B may evaluate the portions of the UI expression that the UI expression evaluator 854 on the client system 850 is not capable of evaluating. For example, the UI expression evaluators 812A-B on the servers 810A-B may determine the functions in the UI expression that the UI expression evaluator 854 on the client system 850 does not support, and evaluate those functions.

The UI expression evaluator 812A-B may then provide the results of the partial evaluation of the UI expression and any unevaluated portion of the UI expression to the UI expression evaluator 854 on the client system 850. For example, the UI expression evaluator 812A-B may provide the unencrypted context and a partially evaluated UI expression to the UI expression evaluator 854 on the client system 850 for the UI expression evaluator 854 on the client system 850 to complete evaluation of the partially evaluated UI expression using the unencrypted context to generate the UI definition.

The client system 850 may include the UI expression evaluator 854 and a UI renderer 852 that may function similarly to any of the UI renderers 162A-N described for system 100, except that the UI render 852 on client system 850 may communicate with the UI expression evaluator 854 on the client system 850. As described above, the UI expression evaluator 854 of the client system 850 may function similarly to the UI expression evaluator 142 described in system 100 but may have different evaluation availability. Accordingly, the UI expression evaluator 854 of the client system 850 may receive partially evaluated UI expressions and contexts from the UI expression evaluators 812A-B on the servers 810A-B. The context received by the UI expression evaluator 854 of the client system 850 may have at least the variables still referenced by the partially evaluated UI expression provided in an unencrypted manner so that the UI expression evaluator 854 may use the values of the variables to complete evaluation of the partially evaluated UI expression.

Additionally or alternatively, the UI expression evaluator 854 may determine when event data from input should be processed by the UI expression evaluator 854 or the UI expression evaluators 812A-B of the servers 810A-B. For example, UI expression evaluator 854 may receive event data corresponding to user input of "G" in a particular text field where the UI expression defines that the value of the particular text field is stored in variable "first." Accordingly, the UI expression evaluator 854 on the client system 850 may process the event data indicating the user input of "G" to update the context by updating the value of the variable "first" to "G." The updated context may then be used for re-evaluating the UI expression. For example, the UI expression evaluator 854 may provide the updated context to the UI expression evaluators 812A-B of the servers 810A-B.

Additionally or alternatively, the UI expression evaluator 854 may determine when the UI expression evaluator 854 may evaluate a UI expression without servers 810A-B. For example, the UI expression evaluator 854 may determine that the update to the context only affects the variable "first" and may determine that the update to the variable "first" only affects the text shown in a textual label. If the UI expression evaluator 854 on the client system 850 determines that the UI expression evaluator 854 has evaluation availability to make the evaluation for the textual label, the UI expression evaluator 854 on the client system 850 may evaluate the UI expression based on the updated context to generate an updated UI definition, without re-evaluation from the UI expression evaluators 812A-B of the servers 810A-B.

The UI expression evaluators 812A-B and 854 may all be able to access information from the information database 830 and UI expressions from the UI expression database 840. For example, the UI expression evaluator 854 on the client system 850 may obtain information from the information database 830 to determine a context and obtain a UI expression from the UI expression database 840 to evaluate based on the determined context to render a GUI. However, as described above, in certain cases the UI expression evaluators 812A-B and 854 may have access to different information. Accordingly, the particular UI expression evaluators 812A-B and 854 that have sole access to particular information needed for evaluating a portion of a particular UI expression may evaluate at least that portion of the particular UI expression.

Figure 9:
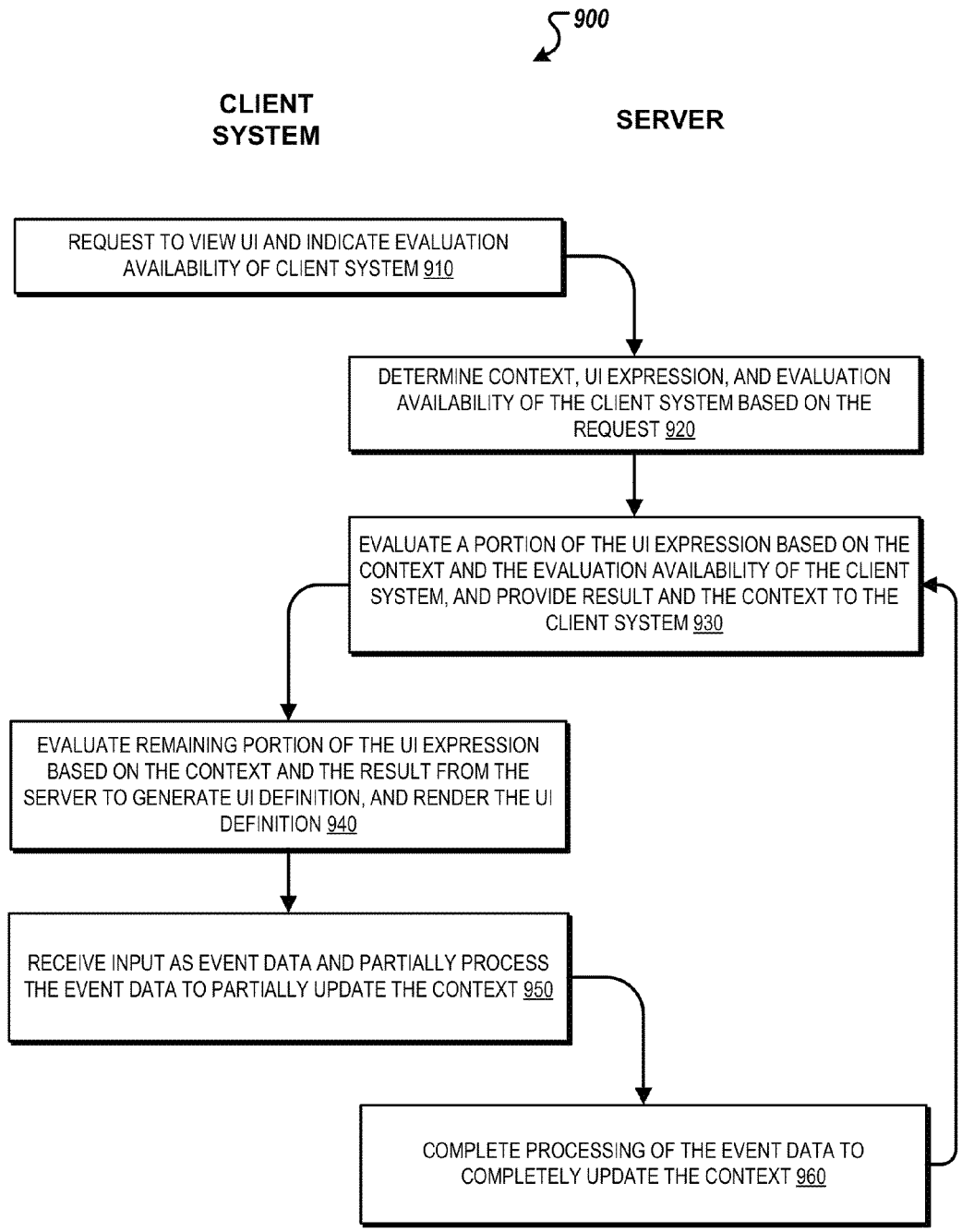
FIG. 9 is a flowchart illustrating an example of a process for a client system and a server to collaboratively evaluate a UI expression to provide a GUI rendered based on a UI expression.

FIG. 9 is a flowchart illustrating an example of a process 900 for a client system and a server to collaboratively evaluate a UI expression to provide a GUI rendered based on a UI expression. The process 900 may be performed by components of the system 800. For example, the client system may be client system 850 and the server may be a first server 810A and/or the second server 810B (hereinafter individually or collectively referred to as "server 810"). The following describes the process 900 as being performed by components of system 100. However, the process 900 may be performed by other systems or system configurations.

The client system 850 may request to view a UI and indicate evaluation availability of the client system (910). For example, as described above, the client system 850 may provide a request to view a GUI for user registration that may be rendered by the UI expression 300 and indicate that the UI expression evaluator 854 is capable of evaluating the functions "if," "and," "not," "isnull," "proper," "index," and "split." In another example, the client system 850 may provide an indication that the UI expression evaluator 854 is for the "Mobile Platform A" for the server 810 to determine the evaluation availability of the client system 850 based on the indication.

The server 810 may determine a context, a UI expression, and the evaluation availability of the client system 850 based on the request (920). For example, the server 810 may determine the context and the UI expression based on the request, information from the information database 830, and the UI expressions stored in the UI expression database 840, similarly to as described above for the UI evaluator (720) for the process (700) described for FIG. 7.

The server 810 may further determine the evaluation availability of the client system 850. For example, in the case where the request indicates the functions that the UI expression evaluator 854 is capable of evaluating, the server 810 may determine the evaluation availability of the client system 850 based on identifying the functions indicated in the request. In another example, in the case where the request indicates the UI expression evaluator 854 is for a particular platform, the server 810 may determine the evaluation availability of the client system 850 based on identifying the functions that UI expression evaluators for the particular platform are capable of evaluating.

The server 810 may evaluate a portion of the UI expression based on the context and the evaluation availability of the client system 850, and provide the result of the evaluation and the context to the client system 850 (930). For example, the server 810 may evaluate the expressions with functions of the UI expression that the server 810 has determined that the UI expression evaluator 854 of the client system 850 does not have evaluation availability to evaluate, and provide the partially evaluated UI expression and context to the client system 850.

The client system 850 may evaluate the remaining portions of the UI expression based on the context and the result from the server 810 to generate the UI definition, and render the UI definition (940). For example, the client system 850 may complete evaluation of the partially evaluated UI expression including functions, e.g., "if," "and," "not," "isnull," "proper," "index," and "split," that the UI expression evaluator 854 of the client system 850 does have evaluation availability to evaluate to generate the UI definition, and then render the UI definition.

The client system 850 may receive input as event data and partially process the event data to partially update the context (950). For example, the client system 850 may receive user input of "George.Washington" as event data for a first text field and partially process the user input by making the user input into lower case "george.washington." The client system 850 may then provide the partially processed event data of "george.washington" for the first text field and provide the context to the server 810.

The server 810 may receive the event data, context, and indication of the evaluation availability of the client system 850, and process the event data to update the context (960). For example, the server 810 may receive the partially processed event data of "george.washington" associated with the first text field, determine from a reference in the event data that "george.washington" should be saved as the value of the variable "username," and update the context by changing the value of the variable "username" to "george.washington."

The process 900 may then repeat with the UI expression evaluator 812A re-evaluating the UI expression based on the updated context and the evaluation availability and providing the result and context to the client system 850. For example, the server 810 may evaluate the expressions with functions that the server 810 has determined that the UI expression evaluator 854 of the client system 850 does not have evaluation availability to evaluate, e.g., "isusernametaken," using the context with the variable "username" having the value "george.washington," and provide the partially evaluated UI expression and context to the client system 850.

The systems 100 and 800 are described as having a particular UI expression evaluated with a particular context generating the same UI definition, regardless of the platform on which the UI definition is to be rendered. For example, the client systems 160A-N may all receive the same UI definition 150 if the client systems 160A-N request to view the same information.

The same UI definition may be used when the UI renderers 162A-N may display the same basic graphical elements. For example, the UI renderers 162A-N may all display buttons, text fields, textual labels, date/time selectors, grids, dropdowns, and charts. However, in some implementations, the UI definitions generated by the UI expression evaluator 142 may be different for different client systems 160A-N. For example, the UI renderer 162A for "Mobile Platform A" may support radio buttons while the UI renderer 162B for "Mobile Platform B" may not support radio buttons. Accordingly, the UI definition 150 generated for the UI renderer 162A may include radio buttons while the UI definition 150 generated for the UI renderer 162B may include a dropdown menu instead of radio buttons.

In some implementations, the system 100 may also account for latency. For example, communications between the server 140 and the client systems 160A-N may be extremely slow so that when a user provides a user input for a first text field that should update the value shown in a second text field, the client system 160A may not receive the updated UI definition with the updated value shown for the second text field until after the user has input a new value for the second text field.

The system 100 could account for latency by preventing user input after event data is sent to the server 140 until the client system 160A receives a new UI definition. However, preventing user input may make the system 100 seem unresponsive to the user. Instead, the system 100 may allow continued interaction with the GUI rendered by the UI renderer 162A based on heuristically estimating what effect the user input will have on the GUI. For example, one heuristic may be that a graphical element that the user is currently interacting with, e.g., inputting a value in, may not be updated in the GUI until the client system 160A receives the last updated UI definition that is expected. The heuristics used for estimating may correspond with particular UI expressions. For example, a first heuristic may be associated with a first UI expression and a second heuristic may be associated with a second UI expression.

In a particular example, the user may provide user input to a first text field that should update the value shown in the second text field, and then start interacting with the second text field before the client system 160A receives the UI definition with the updated value for the second text field. The UI renderer 162A may defer rendering the UI definition that is received while the user is interacting with the second text field. If the user's interaction with the second text field results in an interaction that does not affect the value of the second text field, once the user stops interacting with the second text field, the UI renderer 162A may then render the deferred UI definition that was received while the user was interacting with the second text field. However, if the user's interaction with the second text field results in an interaction that does affect the value of the second text field, the UI renderer 162A may ignore the deferred UI definition.

The process by which the system 100 may account for latency may also be used to account for circumstances when the UI renderer 162A on the client system 160A and the UI expression evaluator 142 on the server 140 are disconnected. The UI renderer 162A may treat a disconnection as an extremely long latency period. For example, assuming that the UI renderer 162 has a UI definition that can be rendered, the user input may interact with the GUI rendered from the UI definition without receiving any updated UI definition from the UI expression evaluator 142. In a particular example, the user may change the values of multiple text fields during the disconnection.

Once a connection is established between the UI renderer 162A on the client system 160A and the UI expression evaluator 142 on the server 140, the UI renderer 162A on the client system 160A may provide event data corresponding to all the user's inputs to the UI expression evaluator 142 for the UI expression evaluator 142 to process the event data to update a context, evaluate the UI expression based on the updated context to generate an updated UI definition, and provide the updated UI definition to the UI renderer 162A to render a GUI. For example, the UI renderer 162A may provide the UI expression evaluator 142 all the user inputs to the multiple text fields. Accordingly, the UI expression evaluator 142 may process all the event data to update a context, evaluate the UI expression based on the updated context to generate a UI definition, and provide the UI definition to the client system 160A.

The disclosed and other examples can be implemented as one or more computer program products, i.e., one or more modules of computer program instructions encoded on a computer readable medium for execution by, or to control the operation of, data processing apparatus. The implementations can include single or distributed processing of algorithms. The computer readable medium can be a machine-readable storage device, a machine-readable storage substrate, a memory device, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer can include a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A computer-implemented method for providing a user interface of a software application, the method comprising:
   receiving, by a server and from a client device, a request to enable a user to perceive the user interface of the software application;
   in response to receiving the request, selecting, by the server, a user interface expression for the user interface of the software application from among multiple user interface expressions corresponding to different user interfaces, wherein each of the user interface expressions is written purely in a declarative programming code and, in relation to variables included in the respective user interface expression, specifies (i) an appearance of a respective user interface and (ii) a behavior of a respective user interface;

identifying the variables included in the selected user interface expression;
determining, by the server, a context that specifies values for the identified variables included in the selected user interface expression;
generating, by the server, a user interface definition, that is a declarative representation of (i) the appearance of the user interface and (ii) the behavior of the user interface, by resolving the selected user interface expression based on the values for the identified variables specified by the context; and
providing, by the server to a user interface renderer on the client device, the user interface definition that is a declarative representation of (i) the appearance of the user interface and (ii) the behavior of the user interface, the user interface renderer being configured to process the user interface definition to enable the user to perceive the user interface in accordance with the user interface definition regarding appearance and behavior of the user interface.

2. The method of claim 1, wherein the user interface is a graphical user interface, and
further comprising the user interface renderer rendering the graphical user interface in a display for perception by the user.

3. The method of claim 1, wherein the user interface renderer is a native application on the client device.

4. The method of claim 1, further comprising:
receiving event data;
updating the context based on the event data;
generating an updated user interface definition by resolving the selected user interface expression based on the values for the identified variables specified by the updated context; and
providing the updated user interface definition to the user interface renderer, the user interface renderer being configured to process the updated user interface definition to enable the user to perceive an updated version of the user interface.

5. The method of claim 4,
wherein the user interface is a graphical user interface, and
further comprising the user interface renderer rendering the graphical user interface in a display for perception by the user and then rendering the updated version of the graphical user interface in the display for perception by the user.

6. The method of claim 4, wherein generating an updated user interface definition by resolving the selected user interface expression based on the values for the identified variables specified by the updated context comprises:
determining a portion of the selected user interface expression to evaluate based on the updated context to generate an updated user interface definition; and
evaluating the determined portion of the selected user interface expression based on the updated context to generate an updated user interface definition.

7. The method of claim 1, wherein receiving event data comprises receiving event data that indicates input from the user in the user interface rendered by the user interface renderer using the user interface definition.

8. The method of claim 1,
wherein receiving the request comprises receiving a request that indicates evaluation availability of a user interface expression evaluator on the client device, and
further comprising determining the evaluation availability of the user interface expression evaluator on the client device.

9. The method of claim 8, wherein generating a user interface definition by resolving the selected user interface expression based on the values for the identified variables specified by the context comprises:
determining a portion of the selected user interface expression to evaluate based on the evaluation availability of the user interface expression evaluator on the client device;
evaluating the determined portion of the selected user interface expression; and
providing a result of evaluating the determined portion of the selected user interface expression and the context to the user interface expression evaluator on the client device.

10. A system for providing a user interface of a software application, the system comprising:
a processor;
one or more instructions encoded in a non-transitory computer-readable storage medium for execution by the processor, the one or more instructions when executed by the processor cause the processor to perform operations comprising:
receiving, by a server and from a client device, a request to enable a user to perceive the user interface of the software application;
in response to receiving the request, selecting, by the server, a user interface expression for the user interface of the software application from among multiple user interface expressions corresponding to different user interfaces, wherein each of the user interface expressions is written purely in a declarative programming code and, in relation to variables included in the respective user interface expression, specifies (i) an appearance of a respective user interface and (ii) a behavior of a respective user interface;
identifying the variables included in the selected user interface expression;
determining, by the server, a context that specifies values for the identified variables included in the selected user interface expression;
generating, by the server, a user interface definition, that is a declarative representation of (i) the appearance of the user interface and (ii) the behavior of the user interface, by resolving the selected user interface expression based on the values for the identified variables specified by the context; and
providing, by the server to a user interface renderer on the client device, the user interface definition that is a declarative representation of (i) the appearance of the user interface and (ii) the behavior of the user interface, the user interface renderer being configured to process the user interface definition to enable the user to perceive the user interface in accordance with the user interface definition regarding appearance and behavior of the user interface.

11. The system of claim 10, further comprising a display, wherein the user interface is a graphical user interface, and wherein the operations further comprise the user interface renderer rendering the graphical user interface in the display for perception by the user.

12. The system of claim 10, wherein the user interface renderer is a native application on the client device.

13. The system of claim 10, the operations further comprising:
receiving event data;
updating the context based on the event data;

generating an updated user interface definition by resolving the selected user interface expression based on the values for the identified variables specified by the updated context; and providing the updated user interface definition to the user interface renderer, the user interface renderer being configured to process the updated user interface definition to enable the user to perceive an updated version of the user interface.

14. The system of claim 13, further comprising a display, wherein the user interface is a graphical user interface, and wherein the operations further comprise the user interface renderer rendering the graphical user interface in the display for perception by the user and then rendering the updated version of the graphical user interface in the display for perception by the user.

15. The system of claim 13, wherein the one or more instructions when executed by the processor cause the processor to generate an updated user interface definition by resolving the selected user interface expression based on the values for the identified variables specified by the updated context comprise one or more instructions that cause the processor to:

determine a portion of the selected user interface expression to evaluate based on the updated context to generate an updated user interface definition; and evaluate the determined portion of the selected user interface expression based on the updated context to generate an updated user interface definition.

16. The system of claim 10, wherein the one or more instructions when executed by the processor cause the processor to receive event data comprise one or more instructions that cause the processor to receive event data that indicates input from the user in the user interface rendered by the user interface renderer using the user interface definition.

17. The system of claim 10, wherein the one or more instructions when executed by the processor cause the processor to receive the request comprise one or more instructions that cause the processor to receive a request that indicates evaluation availability of a user interface expression evaluator on the client device, and wherein the operations further comprise determining the evaluation availability of the user interface expression evaluator on the client device.

18. The system of claim 17, wherein the one or more instructions when executed by the processor cause the processor to generate a user interface definition by resolving the selected user interface expression based on the values for the identified variables specified by the context comprise one or more instructions that cause the processor to:

determine a portion of the selected user interface expression to evaluate based on the evaluation availability of the user interface expression evaluator on the client device;

evaluate the determined portion of the selected user interface expression; and provide a result of evaluating the determined portion of the selected user interface expression and the context to the user interface expression evaluator on the client device.

19. A computer program product for providing a user interface of a software application, embodied in a non-transitory computer-readable medium and including instructions executable by the processor, the instructions when executed configured to cause the processor to perform operations comprising:

receiving, by a server and from a client device, a request to enable a user to perceive the user interface of the software application;

in response to receiving the request, selecting, by the server, a user interface expression for the user interface of the software application from among multiple user interface expressions corresponding to different user interfaces, wherein each of the user interface expressions is written purely in a declarative programming code and, in relation to variables included in the respective user interface expression, specifies (i) an appearance of a respective user interface and (ii) a behavior of a respective user interface;

identifying the variables included in the selected user interface expression;

determining, by the server, a context that specifies values for the identified variables included in the selected user interface expression;

generating, by the server, a user interface definition, that is a declarative representation of (i) the appearance of the user interface and (ii) the behavior of the user interface, by resolving the selected user interface expression based on the values for the identified variables specified by the context;

providing, by the server to a user interface renderer on the client device, the context and the user interface definition that is a declarative representation of (i) the appearance of the user interface and (ii) the behavior of the user interface, the user interface renderer being configured to process the user interface definition to enable the user to perceive the user interface in accordance with the user interface definition regarding appearance and behavior of the user interface;

receiving, by the server, the context and event data from the client device indicating input provided by the user through the user interface rendered from the user interface definition;

in response to receiving the event data, generating, by the server, updated values for the identified variables in the user interface expression based on (i) the values for the identified variables that are specified by the context received from the client device and (ii) the event data;

generating, by the server, an updated user interface definition by resolving the user interface expression based on the updated values for the identified variables; and providing, by the server to the user interface renderer on the client device, the updated user interface definition to the user interface renderer on the client device.

20. The medium of claim 19, wherein the selected user interface expression includes declarative programming code that specifies a label for a variable that is updated based on input from a user into the input field, wherein generating, by the server, a user interface definition, that is a declarative representation of (i) the appearance of the user interface and (ii) the behavior of the user interface, by resolving the selected user interface expression based on the values for the identified variables specified by the context comprises replacing the label for the variable with an obfuscated label for the variable, wherein receiving, by the server, the context and event data from the client device indicating input provided by the user through the user interface rendered from the user interface definition comprises receiving event data that indicates (i) the input from the user and (ii) the obfuscated label for the variable, and wherein in response to receiving the event data, generating, by the server, updated values for the identified variables in the user interface expression based on (i) the values for the identified variables that are specified by the context received from the client device and (ii) the event data comprises:
   determining the variable that is referenced by the obfuscated label in the event data; and
   updating the variable to the value indicated by the input from the user in the event data.

* * * * *